(12) United States Patent
Takahashi

(10) Patent No.: US 10,359,819 B2
(45) Date of Patent: Jul. 23, 2019

(54) IMAGING DEVICE

(71) Applicant: CANON KABUSHIKI KAISHA, Tokyo (JP)

(72) Inventor: Ryo Takahashi, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 149 days.

(21) Appl. No.: 15/285,383

(22) Filed: Oct. 4, 2016

(65) Prior Publication Data
US 2017/0102748 A1 Apr. 13, 2017

(30) Foreign Application Priority Data
Oct. 9, 2015 (JP) .................. 2015-201314

(51) Int. Cl.
G06F 1/20 (2006.01)
H04N 1/00 (2006.01)
H04N 5/232 (2006.01)

(52) U.S. Cl.
CPC ......... G06F 1/206 (2013.01); H04N 1/00477 (2013.01); H04N 1/00925 (2013.01); H04N 5/23216 (2013.01); H04N 5/23241 (2013.01); H04N 5/23245 (2013.01)

(58) Field of Classification Search
CPC ............. G06F 1/206; H04N 5/23216; H04N 5/23245; H04N 1/00925; H04N 1/00477; H04N 5/23241
See application file for complete search history.

(56) References Cited

U.S. PATENT DOCUMENTS

| | | | | |
|---|---|---|---|---|
| 2004/0080717 A1* | 4/2004 | Pate | ............... | H05B 37/03 353/52 |
| 2012/0189264 A1* | 7/2012 | Okazaki | ............... | H04N 5/772 386/227 |
| 2012/0189265 A1* | 7/2012 | Okazaki | ............... | H04N 5/772 386/227 |
| 2014/0380029 A1* | 12/2014 | Tokuda | ............... | H04M 1/72569 713/1 |
| 2016/0249011 A1* | 8/2016 | Lai | ............... | H04N 5/765 |
| 2017/0064632 A1* | 3/2017 | Ohshima | ............... | H04W 52/0251 |

FOREIGN PATENT DOCUMENTS

| | | |
|---|---|---|
| JP | 2007028425 A | 2/2007 |
| JP | 2012165373 A | 8/2012 |

* cited by examiner

Primary Examiner — Timothy J Henn
(74) Attorney, Agent, or Firm — Canon U.S.A., Inc. IP Division

(57) ABSTRACT

An image capture determination unit that determines whether an imaging unit can start an image capture operation from a moving image recording cumulative time stored in a moving image recording cumulative time storage unit and an image capture parameter set by a parameter setting unit, and an image capture restriction control unit that performs processing of imposing a restriction of image capture when the image capture is determined to be not able to be started by the image capture determination unit when receiving an image capture start instruction of the imaging unit are included.

32 Claims, 27 Drawing Sheets

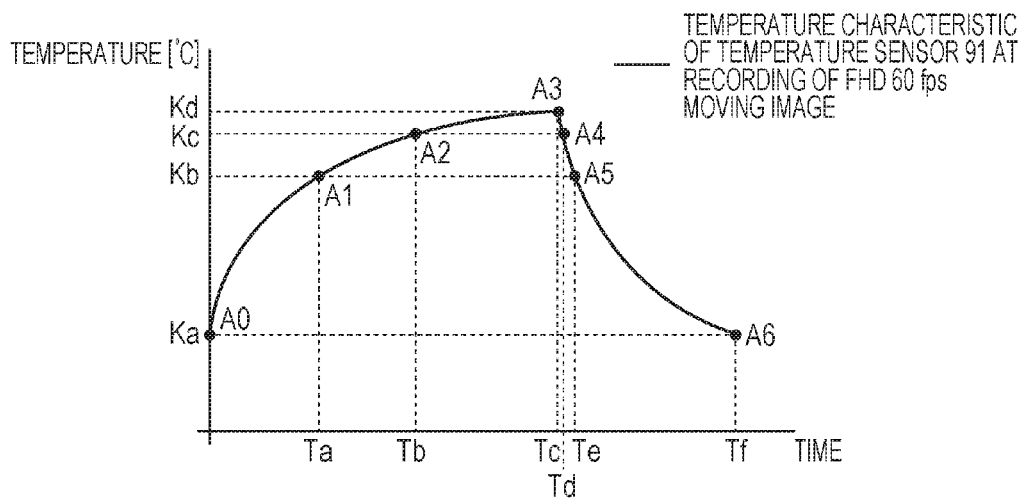

Trecmax MOVING IMAGE RECORDABLE TIME AT A TIME

| TIME | DESCRIPTION |
|---|---|
| Ta | TIME BEFORE Trecmax OF TIME TO EXCEED Kc°C AFTER START OF RECORDING |
| Tb | TIME TO EXCEED Kc°C AFTER START OF RECORDING |
| Tc | TIME TO BATTERY EXHAUSTION AFTER START OF RECORDING |
| Td | TIME TO DECREASE TO Kc POINT AFTER BATTERY EXHAUSTION |
| Te | TIME TO DECREASE TO Kb POINT AFTER BATTERY EXHAUSTION |
| Tf | TIME TO DECREASE TO Ka POINT AFTER BATTERY EXHAUSTION |

| TEMPERATURE | DESCRIPTION |
|---|---|
| Ka | TEMPERATURE AT START OF MOVING IMAGE RECORDING |
| Kb | TEMPERATURE AT Ta TIME |
| Kc | TEMPERATURE OF WARNING |
| Kd | MAXIMUM TEMPERATURE AFTER START OF MOVING IMAGE RECORDING |

FIG. 18

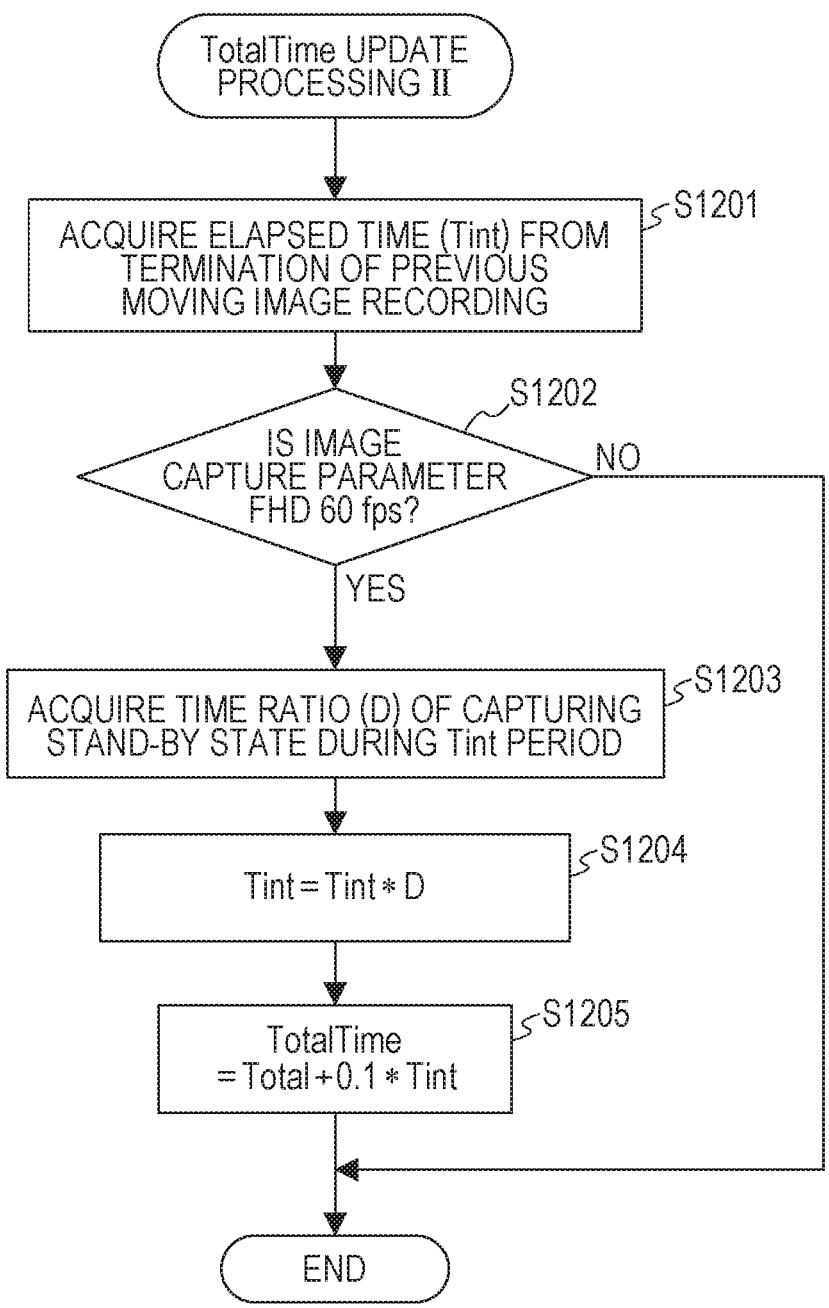

IMAGING DEVICE

BACKGROUND OF THE INVENTION

Field of the Invention

The present invention relates to moving image recording of an imaging device.

Description of the Related Art

In recent years, developing speed of downsizing of mobile devices that can capture moving images is remarkable. Measures against heat, which is generated inside the mobile devices, are important as the downsizing progresses. Especially, capture of moving images often accompanies the heat generation. However, the mobile devices with a small main body volume are difficult to release the heat generated inside the main body. Therefore, in a case where the heat cannot be released with a fan or the like, which cannot be attached due to limitations of the main body volume, there is an actual case where a restriction is set to the use of the device, and when the temperature rises more than a predetermined temperature, the use the device becomes unavailable or the restriction is imposed on a function of the device.

However, to impose the restriction on the use of the device, the temperature needs to be accurately measured. For the accurate measurement, there is a technology of including a temperature sensor inside the device, and forcibly shutting down a power supply of the device when the temperature rises more than a predetermined temperature (see Japanese Patent Laid-Open No. 2012-165373).

However, this technology requires the temperature sensor for identifying whether the temperature rises to the predetermined temperature. Mount of the temperature sensor is costly, and it is difficult to layout the temperature sensor in a position where the sensor can detect touch of skin of a user for appearance reasons. Therefore, it is desirable to be able to determine whether a camera has a high temperature, without using the temperature sensor.

Further, there is a technology of displaying a prohibition operation on a display unit of the device when the temperature measured by the temperature sensor rises to a predetermined temperature (see Japanese Patent Laid-Open No. 2007-028425). Similarly, use of the temperature sensor involves an extra cost. Further, the fact of heat generation is displayed on a GUI display unit with an icon or the like, and thus the display becomes an obstacle for the user who inherently wishes to concentrate on image capture operation, and thus there is a disadvantage of robbing concentration on a live video image.

Meanwhile, there is another problem of a decrease in accuracy when the temperature sensor is not used depending on circumstances of image capture. It is good if an OFF state of the device continues long. However, for example, there is a possibility that the temperature of the camera may be decreased even if only slightly during a short time between moving image recording and moving image recording, that is, during a time when no image capture is performed. It is further desirable to support such a case.

Further, when the temperature sensor has some sort of trouble, it is desirable to support the trouble.

SUMMARY OF THE INVENTION

An imaging device of the present invention includes an imaging unit capable of capturing a moving image or a series of images, an image capture start instruction receiving unit configured to receive an operation start instruction of the imaging unit, an image capture parameter setting unit capable of setting at least one image capture parameter to the imaging unit, a moving image recording time accumulation unit configured to accumulate a time used to record the moving image, a moving image recording cumulative time storage unit configured to store a moving image recording cumulative time accumulated by the moving image recording time accumulation unit, an image capture determination unit configured to determine whether the imaging unit is able to start an image capture operation from the moving image recording cumulative time stored in the moving image recording cumulative time storage unit and the image capture parameter set by the parameter setting unit, and an image capture restriction control unit configured to perform processing of imposing a restriction on image capture when the image capture is determined to be not able to be started by the image capture determination unit when the image capture start instruction receiving unit has received an image capture start instruction.

Further features of the present invention will become apparent from the following description of exemplary embodiments (with reference to the attached drawings).

BRIEF DESCRIPTION OF THE DRAWINGS

FIG. 4A is a diagram illustrating a temperature characteristic of a temperature sensor 91 when moving image recording is performed at FHD 60 fps, and FIG. 4B is a table for describing values illustrated in the graph of FIG. 4A.

FIGS. 18(1) to 18(4) are screen diagrams of an image capture standby state of an imaging device as an exemplary embodiment of the present invention.

FIG. 22B is a diagram illustrating a processing flow in TotalTime update processing (2), of an imaging device as an exemplary embodiment of the present invention.

DESCRIPTION OF THE EMBODIMENTS

Hereinafter, favorable exemplary embodiments of the present invention will be described with reference to the drawings.

Figure 1:
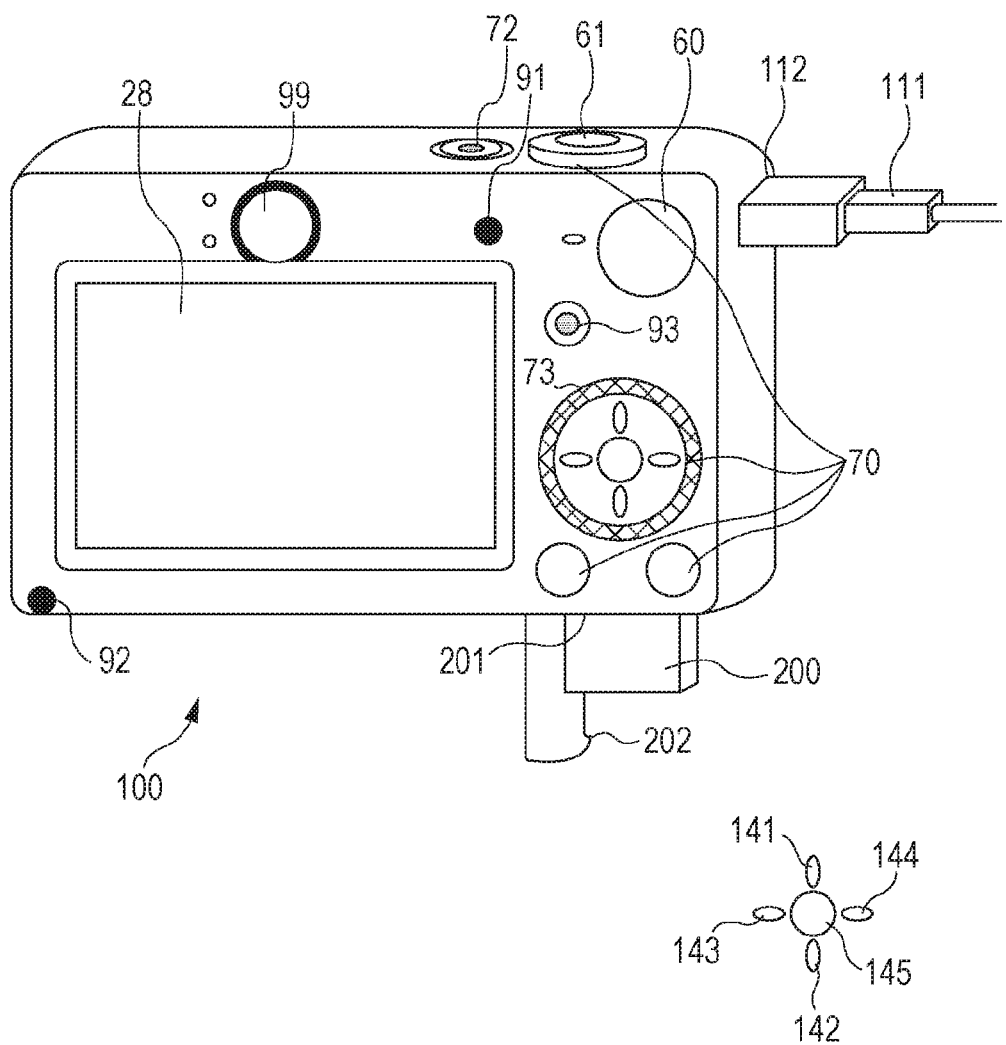
FIG. 1 is a diagram illustrating an example of appearance of an imaging device 100.

FIG. 1 illustrates an appearance view of a digital camera 100 as an example of an imaging device of the present invention. A display unit 28 is a display unit that displays images and various types of information. The display unit 28 is configured from a touch panel, and can detect contact to the display unit 28. A shutter button 61 is an operation unit for performing an image capture instruction. A mode selection switch 60 is an operation unit for switching various modes. A connector 112 is a connector between a connection cable 111 and the digital camera 100. An operation unit 70 is an operation unit made of operation members including various switches that receive various operations from a user, buttons, and a touch panel. A controller wheel 73 is a rotationally operable operation member included in the operation unit 70. An operation unit 93 is a special button (hereinafter, called moving image button 93) for starting or stopping moving image recording. A power supply switch 72 switches power supply ON and power supply OFF. A recording medium 200 is a recording medium such as a memory card or a hard disk. A recording medium slot 201 is a slot for storing the recording medium 200. The recording medium 200 stored in the recording medium slot 201 becomes able to perform communication with the digital camera 100. A lid 202 is a lid of the recording medium slot 201.

A temperature sensor 91 is mounted inside the display unit 28. This temperature sensor 91 is suitable for detecting the temperature inside the digital camera 100 (temperature detection unit).

A temperature sensor 92 is mounted on an exterior of the digital camera 100. This temperature sensor 92 is suitable for detecting the temperature outside the digital camera 100, that is, an outside air temperature.

Figure 2:
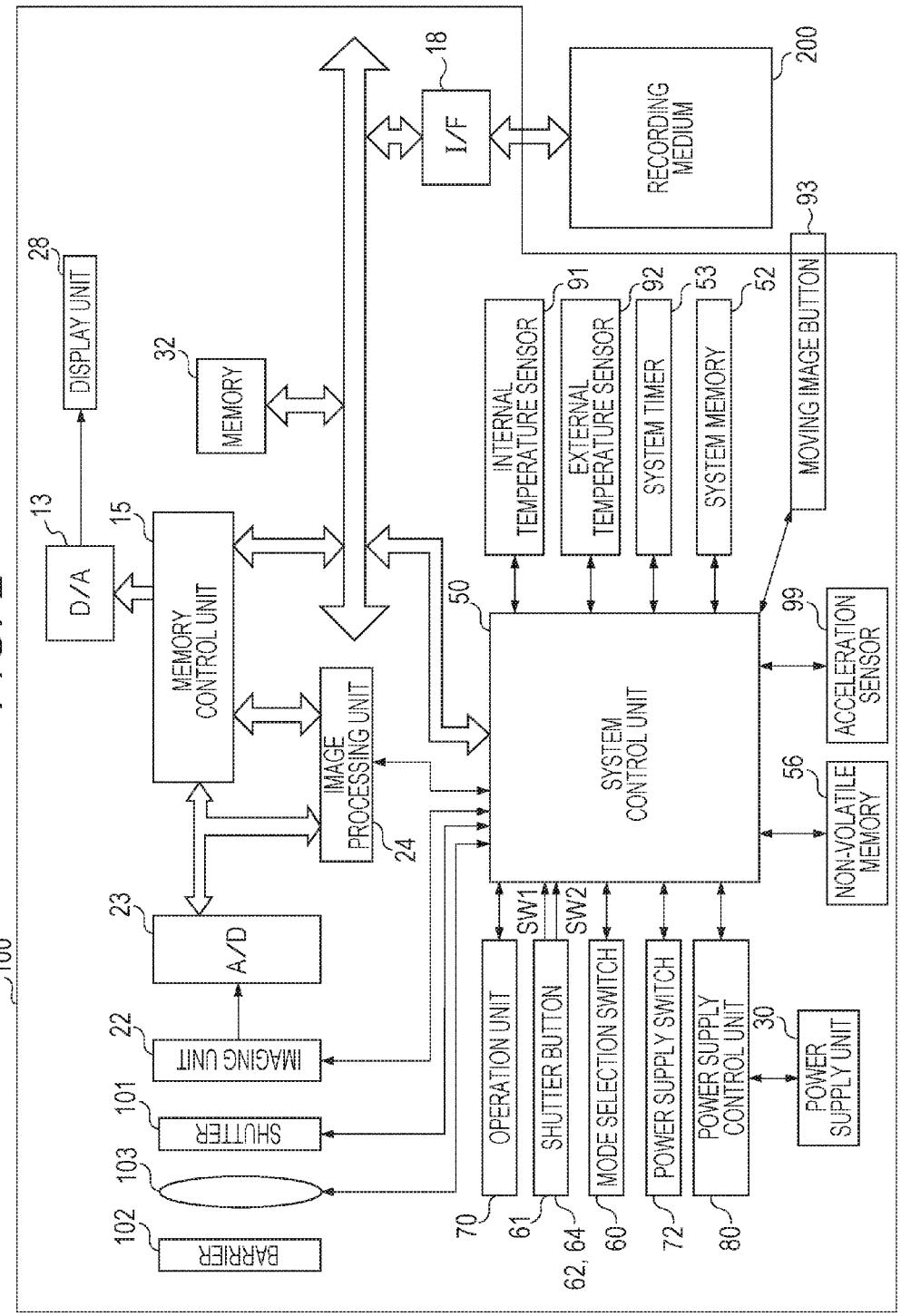
FIG. 2 is a diagram illustrating an example of a hardware configuration of the imaging device 100.

FIG. 2 is a block diagram illustrating a configuration example of the digital camera 100 according to the present exemplary embodiment. FIG. 2 illustrates an image capture lens 103 including a focus lens, a shutter 101 having an aperture function, and an imaging unit 22 configured from a CCD or CMOS element that converts an optical image into an electrical signal. An A/D converter 23 converts an analog signal into a digital signal. The A/D converter 23 is used to convert the analog signal output from the imaging unit 22 into the digital signal. A barrier 102 prevents dirt and damage of the imaging system including the image capture lens 103, the shutter 101, and the imaging unit 22 by covering the imaging unit including the image capture lens 103, of the digital camera 100.

An image processing unit 24 performs predetermined pixel interpolation, resize processing such as reduction, and color conversion processing, for data from the A/D converter 23 or data from a memory control unit 15. Further, the image processing unit 24 performs predetermined calculation processing using imaged image data, and a system control unit 50 performs exposure control and ranging control on the basis of the obtained calculation result. Accordingly, autofocus (AF) processing in the through the lens (TTL) format, automatic exposure (AE) processing, and flash preliminary light emission (EF) processing are performed. Further, the image processing unit 24 performs predetermined calculation processing using the imaged image data, and also performs automatic white balance (AWB) processing in the TTL format on the basis of the obtained calculation result.

Output data from the A/D converter 23 is directly written in a memory 32 through the image processing unit 24 and the memory control unit 15, or through the memory control unit 15. The memory 32 stores image data obtained by the imaging unit 22 and converted by the A/D converter 23 into digital data, or image data for displaying in the display unit 28. The memory 32 has a sufficient storage capacity for storing a predetermined number of still images or a moving image and a sound in a predetermined time. If the image data imaged using the image display unit 28 is successively displayed, an electronic viewfinder function (live view display) can be realized.

Further, the memory 32 also serves as an image display memory (video memory). A D/A converter 13 converts image display data stored in the memory 32 into an analog signal and supplies the analog signal to the display unit 28. The image data for display written in the memory 32 in this way is displayed by the display unit 28 through the D/A converter 13. The display unit 28 performs display on the display device such as an LCD, according to the analog signal from the D/A converter 13.

A non-volatile memory 56 is an electrically erasable/recordable memory, and an EEPROM or the like is used, for example. The non-volatile memory 56 stores constants and programs for operation of the system control unit 50. The programs referred here are programs for executing various flowcharts described below in the present exemplary embodiment.

The system control unit 50 controls the entire digital camera 100. The system control unit 50 realizes processing of the present exemplary embodiment by executing the programs recorded in the non-volatile memory 56. A system memory 52 is a RAM. In the system memory 52, constants for operation of the system control unit 50, variables, the programs read from the non-volatile memory 56, and the like are expanded. Further, the system control unit 50 performs display control by controlling the memory 32, the D/A converter 13, the display unit 28, and the like.

The mode selection switch 60, a first shutter switch 62, a second shutter switch 64, and the operation unit 70 are operation means for inputting various operation instructions to the system control unit 50. The mode selection switch 60 switches an operation mode of the system control unit 50 to either an image capture mode in which a still image and a moving image are recordable, and a playback mode. The first shutter switch 62 is turned ON in the middle of the operation of the shutter button 61 provided in the digital camera 100, by so-called half-press (image capture preparation operation instruction), and generates a first shutter switch signal SW1. With the first shutter switch signal SW1, operations such as autofocus (AF) processing, automatic exposure (AE) processing, automatic white balance (AWB) processing, and flash preliminary light emission (EF) processing (hereinafter, at least one of the types of processing is called image capture preparation operation) are started. These types of processing are controlled by the system control unit 50.

The second shutter switch 64 is turned ON by operation complete of the shutter button 61, by so-called full press (image capture instruction), and generates a second shutter switch signal SW2. The system control unit 50 starts operations of a series of image capture processing from read-out of the signal from the imaging unit 22 to write of the image data to the recording medium 200 upon receipt of the second shutter switch signal SW2.

The operation members of the operation unit 70 are appropriately allocated to functions in every scene, by selecting and operating various function icons displayed in the display unit 28, and act as various function buttons. Examples of the function buttons include a termination button, a return button, an image feed button, a jump button, a narrowing-down button, and an attribute change button. For example, when a menu button is pressed, a menu screen that enables various types of setting is displayed in the display unit 28. A user can intuitively perform various types of settings using the menu screen, four-direction buttons, and a SET button displayed in the display unit 28.

The four-direction buttons define an upper button 141, a lower button 142, a left button 143, a right button 144, and a SET button 145.

The controller wheel 73 is a rotationally operable operation member included in the operation unit 70, and is used to instruct a selected item, together with the direction buttons.

A power supply control unit 80 is configured from a battery detecting circuit, a DC-DC converter, a switch circuit that switches a block to be energized, and the like, and detects mount of a battery, a type of the battery, and a remaining battery capacity. Further, the power supply control unit 80 controls the DC-DC converter on the basis of detection results thereof and an instruction of the system control unit 50, and supplies necessary voltages to the respective units including the recording medium 200 for necessary periods.

A power supply unit 30 is made of a primary battery such as an alkaline battery or a lithium battery, a secondary battery such as an NiCd battery, an NiMH battery, or an Li battery, an AC adaptor, and the like. An interface 18 is an interface between the camera 100 and the recording medium 200 such as a memory card or a hard disk. The recording medium 200 is a recording medium such as a memory card, and is configured from a semiconductor memory, a magnetic disk, or the like.

Figure 3:
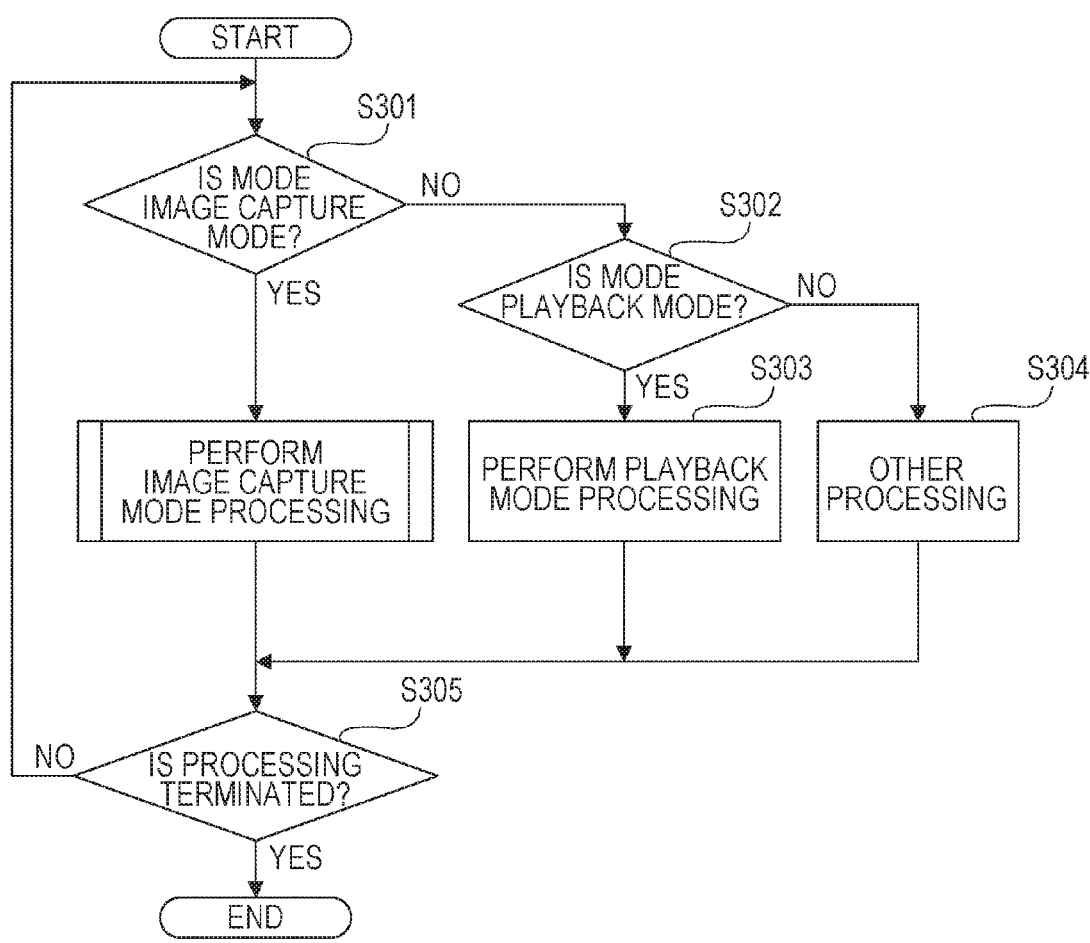
FIG. 3 is a diagram illustrating a basic flow from start up to termination of an imaging device as an exemplary embodiment of the present invention.

FIG. 3 is a flowchart illustrating a basic flow from start up to termination of a digital camera 100.

After the startup of the camera 100, the flow proceeds to step S301. In step S301, determination as to whether the mode is the image capture mode is made according to the position of the mode selection switch 60. When the mode is determined to be the image capture mode, the flow proceeds to image capture mode processing. Since the image capture mode processing will be described below, description here is omitted. Then, when the image capture mode is terminated, the flow proceeds to step S305. When the mode is determined not to be the image capture mode, the flow proceeds to step S302. In step S302, determination as to whether the mode is the playback mode is made according to the position of the mode selection switch 60. When the mode is determined to be the playback mode, the flow proceeds to step S303, and when the mode is determined not to be the playback mode, the flow proceeds to step S304. In step S303, playback mode processing is performed. The processing in the playback mode referred here includes browsing of a captured image, performing of a slideshow, and deleting of an image. Then, when the playback mode is terminated, the flow proceeds to step S305. In step S304, other processing is performed. An example of the other processing referred here includes processing in a clock display mode in which only a current time is displayed. When the mode processing is terminated, the flow proceeds to step S305, and determination as to whether the camera operation is shut down is made. When the shutdown is determined, the camera operation is terminated. When the shutdown is not determined, the flow proceeds to step S301.

In the processing in the image capture mode, image capture of a still image and recording of a moving image are performed. In the present invention, the processing in the image capture mode will be described in detail in [First Exemplary Embodiment], [Second Exemplary Embodiment], and [Third Exemplary Embodiment] described below. Before the description, basic points of view will be described.

First, in a use case of moving image recording, which is an optimum exemplary embodiment as an example of the present invention, how the temperature inside a device is changed due to heat generation at the time of the moving image recording according to a recording time, that is, a temperature rising characteristic at the time of the moving image recording will be described. In the present exemplary embodiment, the temperature sensor 91 may be used to measure the temperature inside the device. How an output value (=the temperature of the temperature sensor 91 is changed at the time of the moving image recording according to the recording time is illustrated in FIGS. 4A and 4B.

As a precondition in the entire the present exemplary embodiment, the moving image recording is started from a state of a room temperature Ka [° C.]. The state of that time is illustrated by the point A0 in FIG. 4A. When the moving image recording is started, the output value of the sensor rises as time proceeds. While the moving image recording continues, the battery eventually runs out, and the moving image recording is forcibly terminated. The state of this time is illustrated by the point A3 in FIG. 4A. Here, the highest temperature when the moving image recording is performed from the state of the room temperature Ka [° C.] until when the battery runs out is illustrated by Kd [° C.], and the time up to when the battery runs out is illustrated by Tc [min]. After that (after the battery is dead), the device is in a pausing state, and thus the output value of the temperature sensor is lowered. Finally, the output value is lowered to Ka [° C.] that is the room temperature. Here, another basic point of view, the moving image recording can be continued until the battery runs out, and the room temperature is kept to Ka [° C.]during the moving image recording. The state of this time is illustrated by the point A6 in FIG. 4A. Further, normal moving image recording is typically set such that continuous recording can be performed only for a predetermined time (the time predetermined time in which the moving image recording can be performed is Trecmax). A moving image recordable device from a fully charged state to runout of the battery is rare. When Trecmax has passed after the start of the moving image recording, the recording is forcibly terminated. FIG. 4A is illustrated such that there is no interval time between the moving image recording and the next moving image recording.

Further, the points A1, A2, A4, and A5, which are midpoints of A0→A3→A6 illustrated in FIG. 4A, will be described. The point A2 is a point where an internal temperature of the device used in the present exemplary embodiment is about to reach the temperature at which, if the temperature rises than this temperature, an exterior of the device becomes hot and a user should look out for continuous hold of the device. This point is called warning point in the present exemplary embodiment. The temperature of this warning point is Kc [° C.], and the time to reach the warning point after the start of the moving image recording is Tb [min]. In essence, it is necessary to control the temperature in the moving image recording not to exceed the temperature Kc [° C.] of the warning point. The point A1 indicates a point before a Trecmax time, which is about to reach the point A2. The temperature at this time is Kb [° C.], and the time to reach Kb [° C.] after the start of the moving image recording is Ta [min]. That is, when the output value of the temperature sensor is Kb [° C.], the temperature of subsequent one time of the moving image recording is guaranteed no to exceed the warning point. The point A4 indicates a point where the internal temperature becomes the temperature Kc [° C.] of the warning point due to lowering of the temperature after the battery is dead. The time at this time is Td [min]. Further, the point A5 indicates a point where the internal temperature becomes a temperature Kb [° C.] of the warning point due to lowering of the temperature after the battery is dead. The time at this time is Te [min]. Further, a time after the battery is dead to when the temperature is lowered to the room temperature Ka [° C.] is Tf [min].

The use of the points A1, A2, A4, and A5 will be described below.

Figure 5A:
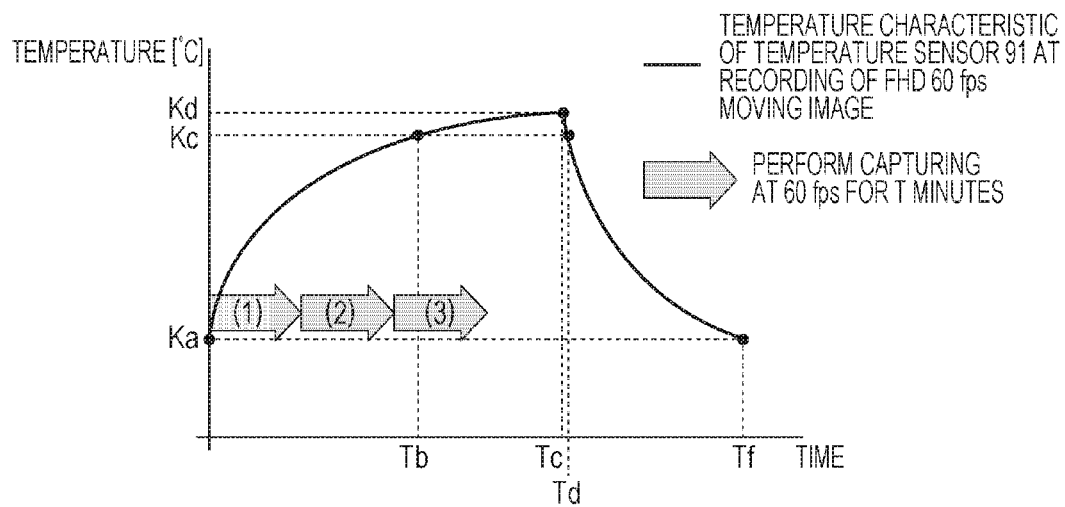
FIG. 5A is another diagram illustrating a temperature characteristic of the temperature sensor 91 when moving image recording is performed at FHD 60 fps.
Figure 5B:
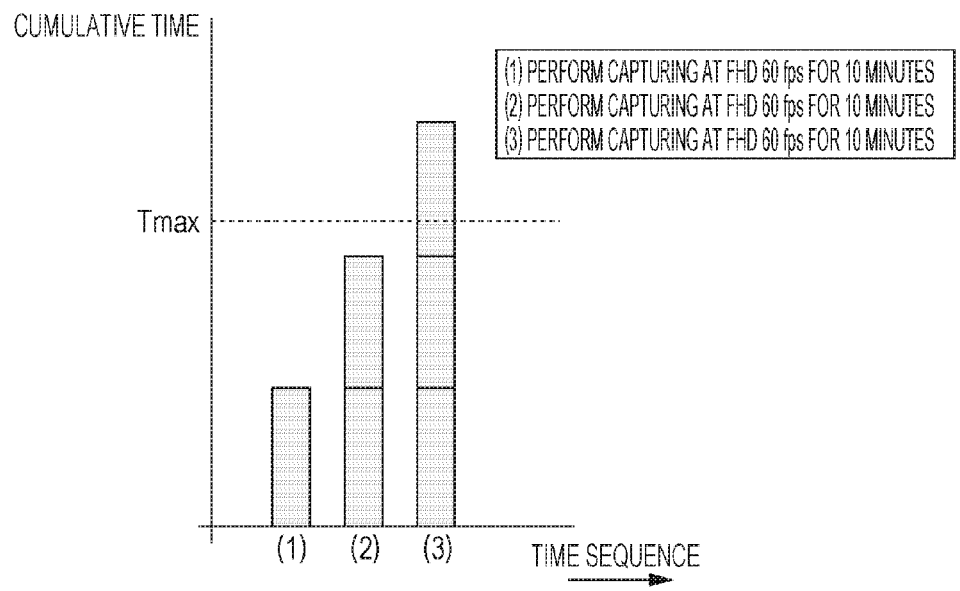
FIG. 5B is a diagram illustrating a transition of a moving image recording total time when the operation illustrated in FIG. 5A is performed.

In the present exemplary embodiment, even devices not equipped with the temperature sensor are also required to control such that the temperature does not excessively rise in the moving image recording. Therefore, it is necessary to know how much the temperature rises in the moving image recording of one time, that is, in recording for the Trecmax time. The temperature rise can be obtained from the temperature curve of a temperature rising characteristic and a temperature lowering characteristic of the temperature sensor illustrated in FIG. 4A. FIG. 5A is a diagram in which the temperature curve of FIG. 4A and an example in which the recording at FHD 60 fps by Trecmax is repeated three times are combined. For example, Trecmax is 10 minutes and Tb is 21 minutes. When the three times of moving image recording are performed where an interval time between recording and recording is 0, the temperature does not exceed Kc [° C.] that is the warning point up to the second time of the moving image recording, and does exceeds Kc [° C.] in the moving image recording of the third time. That is, in terms of user operation, the moving image recording up to the second time is possible, and the moving image recording of the third time is not possible. The Tb time at this time is a restriction time Tmax, and when the restriction time Tmax [min] has passed under a room temperature environment, which is a base, the temperature exceeds the warning point Kc [° C.]. Therefore, the devices are required to control not to exceed the warning point Kc [° C.]. The characteristics can be expressed by another form of diagram like FIG. 5A. FIG. 5B is a diagram illustrating how a cumulative time is increased when the moving image recording time is accumulated every time the moving image recording is started. It can be seen that the cumulative time exceeds the restriction time Tmax at the recording of the third time when the recording is performed at the FHD 60 fps pixel for 10 minutes.

Figure 6A:
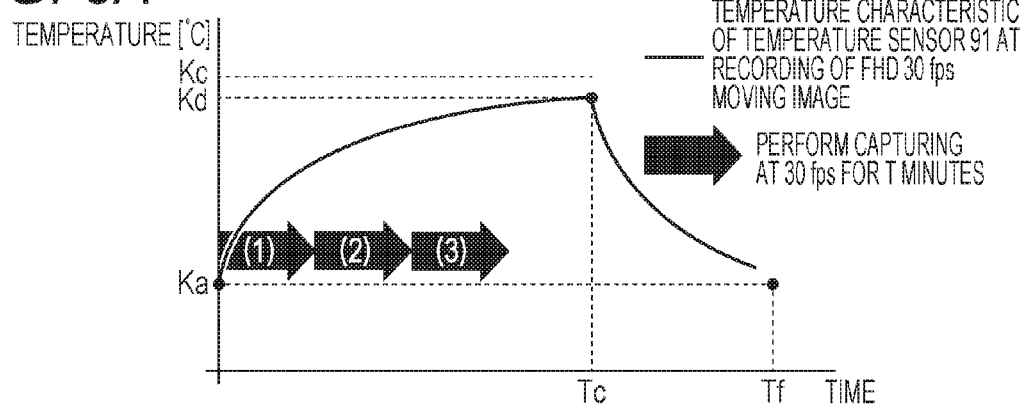
FIG. 6A is a diagram illustrating a temperature characteristic of the temperature sensor 91 when moving image recording is performed at FHD 30 fps.
Figure 6B:
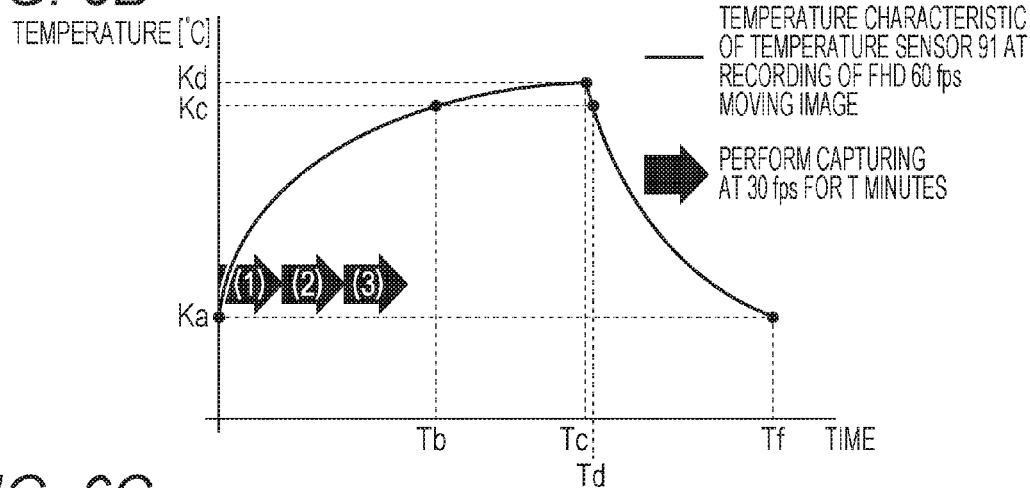
FIG. 6B is a diagram illustrating a temperature characteristic of the temperature sensor 91 when moving image recording is performed at FHD 60 fps.
Figure 6C:
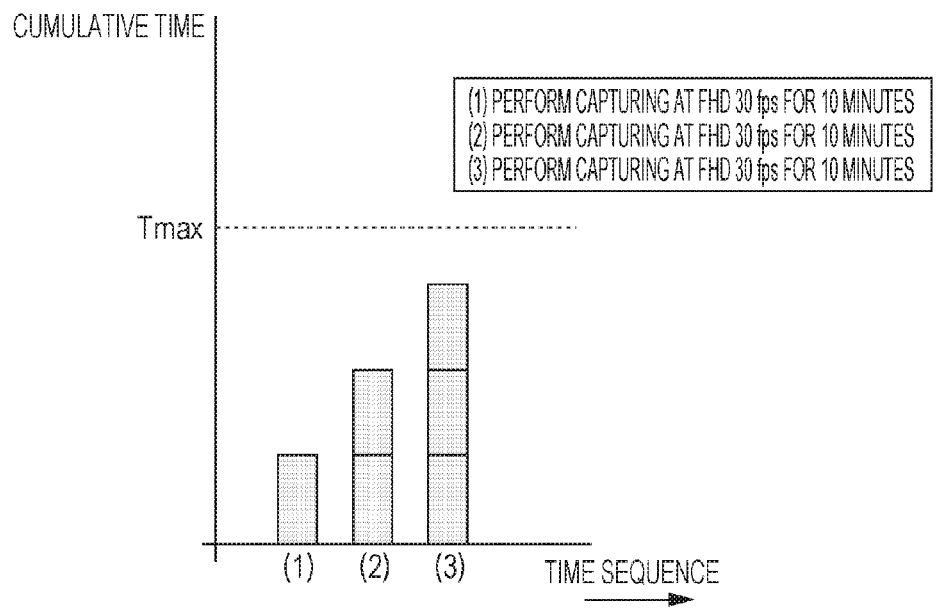
FIG. 6C is a diagram illustrating a transition of a moving image recording total time when the operation illustrated in FIG. 6B is performed.

FIG. 6A is a diagram in which a temperature characteristic curve at FHD 30 fps is combined with an example in which recording at FHD 30 fps by Trecmax is repeated three times. Here, the three times of moving image recording is also performed where Trecmax is 10 minutes and the interval time between recording and recording is 0. However, unlike the case of FHD 60 fps, the temperature does not exceed Kc [° C.] that is the warning point even if the recording is performed three times. The meaning here is that the moving image recording at the FHD 30 fps pixel does not generate heat, compared with the moving image recording at FHD 60 fps, and thus does not generate heat to the warning point Kc [° C.] until the battery runs out (Kd<Kc). That is, the calorific value by the moving image recording of one time is smaller than that of FHD 60 fps. This result is superimposed on the temperature curve of FHD 60 fps and illustrated in FIG. 6B. That is, FIG. 6B indicates that the temperature does not rise compared with FIG. 5A even if the image capture is performed for the same time (10 minutes). Further, when the result is illustrated in FIG. 6C such that the time used to record the moving image is accumulated, it is found that the temperature does not exceed the restriction time Tmax even if the recording is performed three times. As described above, when the recording pixels of the moving image are different, it is necessary to convert the image capture of a smaller calorific value into the image capture time of a larger calorific value, and to accumulate the recording time.

Figure 7A:
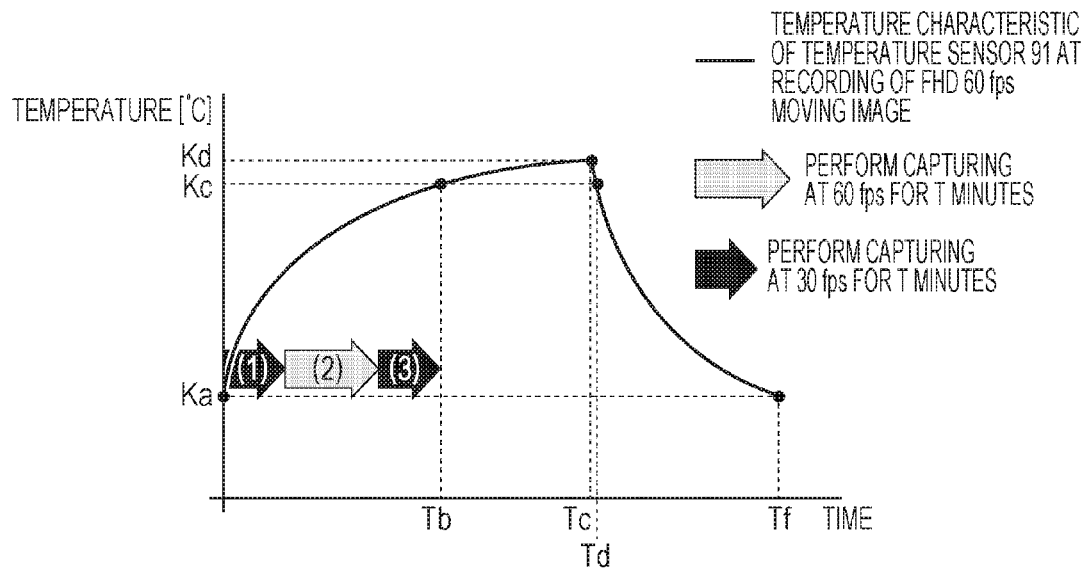
FIG. 7A is a diagram illustrating a temperature characteristic of the temperature sensor 91 when moving image recording is performed in combination of FHD 60 fps and FHD 30 fps.
Figure 7B:
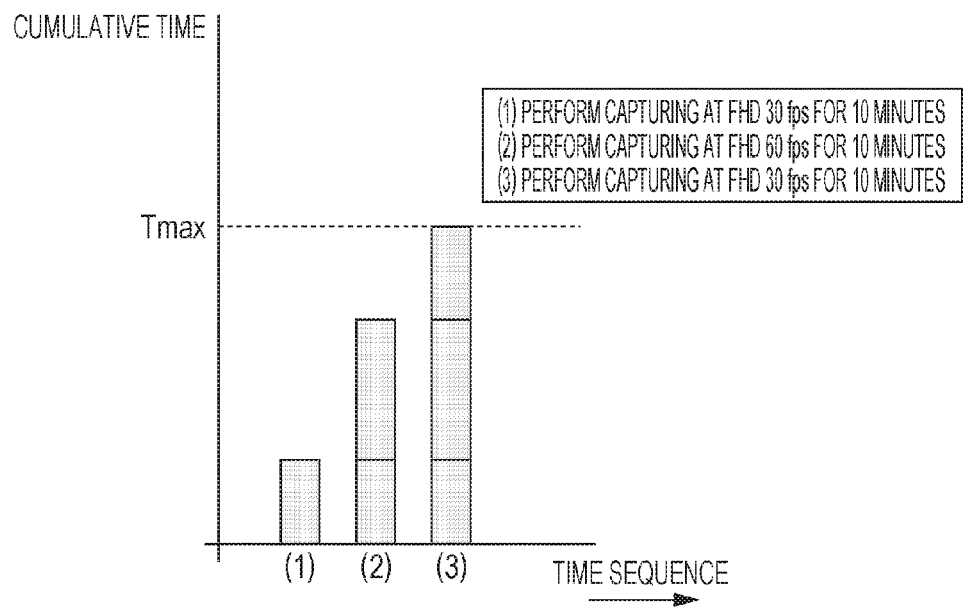
FIG. 7B is a diagram illustrating a transition of a moving image recording total time when the operation illustrated in FIG. 7A is performed.

FIGS. 7A and 7B illustrate an example of a case in which recording at FHD 30 fps and at FHD 60 fps are alternately performed, as against a temperature characteristic curve at FHD 60 fps. That is, the way of rising of the temperature differs between the case where recording is performed three times only at FHD 60 fps, and the case in which FHD 60 fps and FHD 30 fps are combined.

Hereinafter, exemplary embodiments will be described on the basis of the above content.

First Exemplary Embodiment

Figure 8:
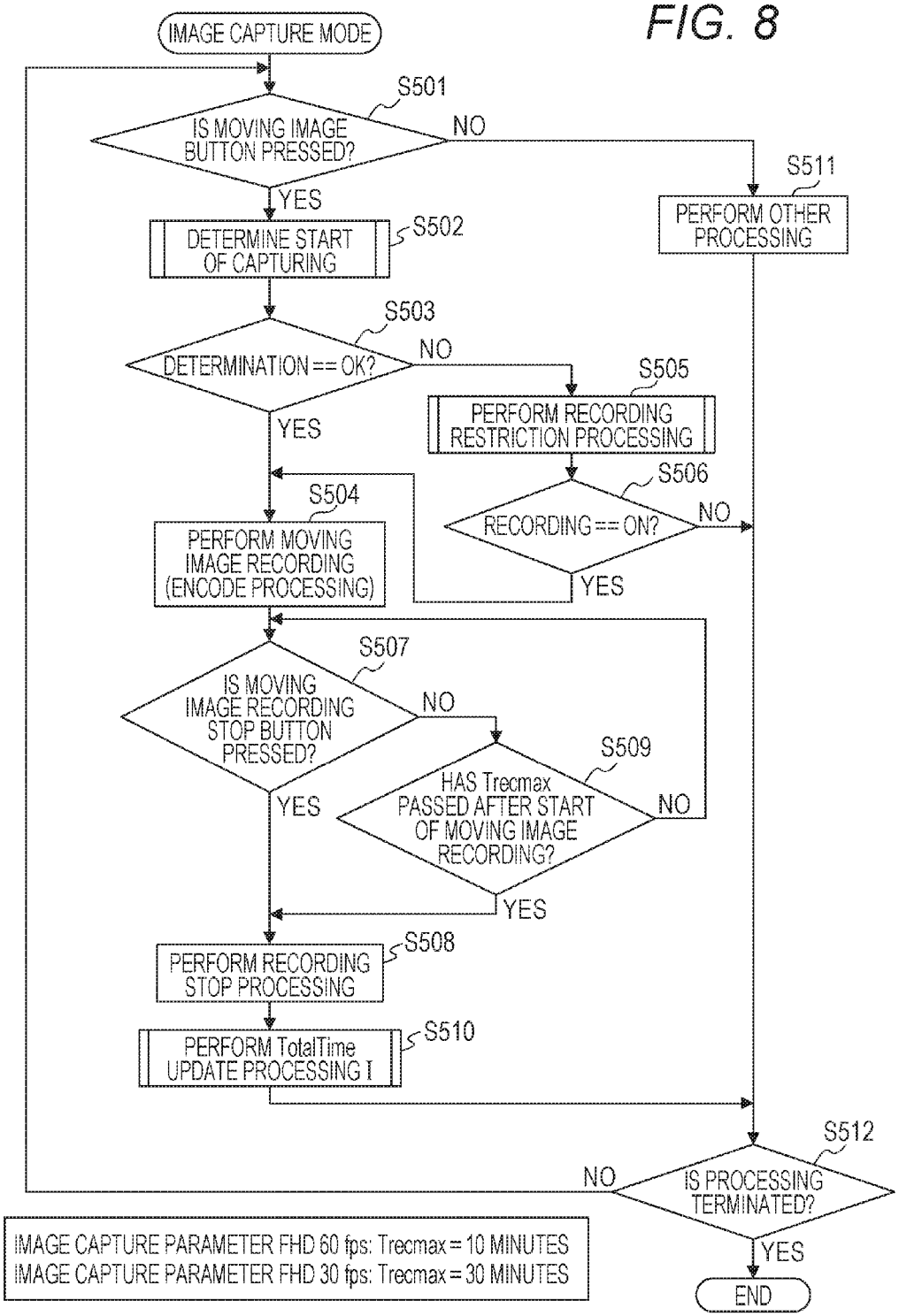
FIG. 8 is a diagram illustrating a processing flow (first exemplary embodiment) in an image capture mode, of an imaging device as an exemplary embodiment of the present invention.

FIG. 8 is a flowchart illustrating processing in an image capture mode, which is an optimum embodiment as the first exemplary embodiment of the present invention. The processing here is mainly described about moving image recording.

In step S501, determination as to whether a moving image button 93 has been pressed down is made. When the moving image button is determined to be pressed down, the processing proceeds to step S502. When a button other than the moving image button is pressed down, the processing proceeds to step S511.

In step S502, determination as to whether moving image recording can be started, that is, "image capture start determination" processing, is made (description will be given below). Then, the processing proceeds to step S503.

In step S503, confirmation as to whether the image capture start determination has been OK in step S502 (whether an image capture start determination flag is ON) is performed. The processing proceeds to step S504 when OK, and proceeds to step S505 when NG (no good).

In step S504, the moving image recording, that is, encode processing is started. Then, the processing proceeds to step S507.

In step S505, the image capture start is determined to be NG in step S503 and a restriction of not allowing the moving image recording is imposed on its unchanged setting parameter, and thus how the restriction is imposed is confirmed. That is, "recording restriction processing" is performed (description will be given below). When the processing is terminated, the processing proceeds to step S506.

In step S506, whether the recording is started (whether a recording flag is ON) in the state where the restriction is imposed is confirmed in the "recording restriction processing" of step S505. When the recording is determined to be started, the processing proceeds to step S504, and the moving image recording is started on the basis of a set image capture parameter. When the recording is not started, the processing proceeds to step S512.

In step S507, whether the moving image button 93 has been pressed down again, that is, whether a moving image recording stop instruction has been given is confirmed. When the moving image button 93 is determined to be pressed down, the processing proceeds to step S508. When the moving image button 93 is not pressed down, the processing proceeds to step S509 (the moving image recording is continued).

In step S508, the moving image recording is stopped as the moving image recording stop instruction has been given in step S507, and the encode processing as a moving image file is terminated. The processing proceeds to step S510.

In step S509, after the start of the moving image recording, determination as to whether a moving image recordable time (Trecmax) has passed in the image capture instruction time of one time is made. When the Trecmax has passed, the processing proceeds to step S508, and the moving image recording is stopped. When Trecmax has not passed yet, the moving image recording is continued, and the processing proceeds to step S507 and stop of the moving image recording is waited.

In step S510, after moving image recording termination, processing of accumulating the time used to record the moving image at that time, that is, "TotalTime update processing" is performed. As described above, how much the internal temperature of the device rises can be estimated by accumulating the moving image recording. Therefore, like the processing of step S510, processing of adding the time used to record the moving image this time to the moving image recording time accumulated up to that time is performed when the moving image recording is terminated. A detailed flow will be described below. Then, the processing proceeds to step S512.

In step S511, processing other than the moving image recording is performed. Examples of the processing other than the moving image recording referred here include image capture of a still image, and a change operation of the image capture parameter. Then, the processing proceeds to step S512.

In step S512, determination as to whether the image capture mode is terminated is made. When the image capture mode is determined to be terminated, the image capture mode is terminated. When the image capture mode is determined not to be terminated, the processing returns to step S501, and the processing stands by an operation instruction.

Note that, as for the time of Trecmax described in step S509, Trecmax=10 minutes in a case where the parameter set to the moving image recording is FHD 60 fps mode, and Trecmax=30 minutes in a case where the parameter is FHD 30 fps mode, in the present exemplary embodiment. The processing amount becomes larger and the power consumption is increased, as the frame rate becomes larger. Therefore, the moving image recordable times in one-time operation are separately defined.

Figure 9:
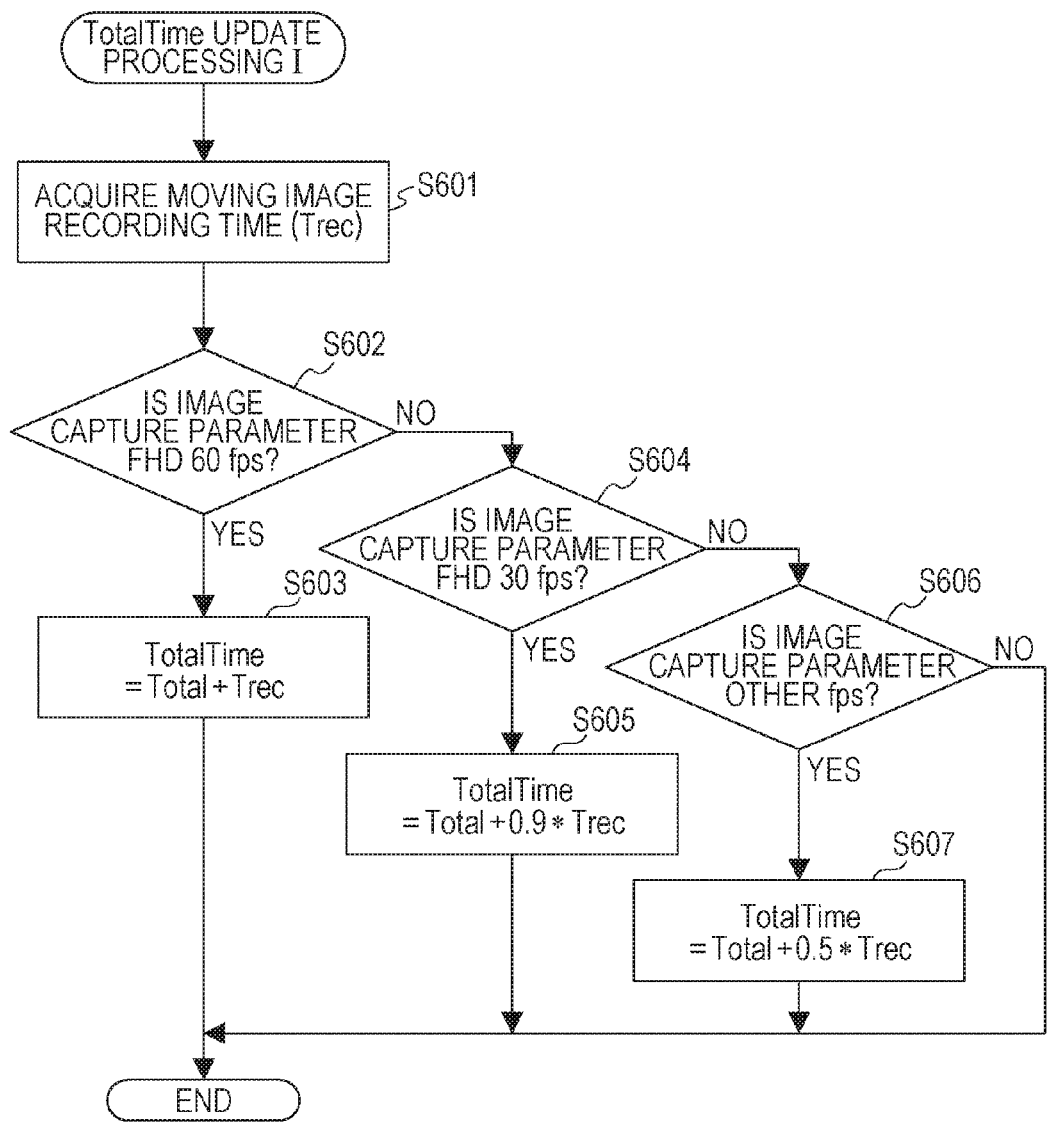
FIG. 9 is a diagram illustrating a processing flow in TotalTime update processing (1) of an imaging device as an exemplary embodiment of the present invention.

FIG. 9 illustrates details of the "TotalTime update processing" of step S510 described above.

In step S601, the processing from steps S504 to S508, that is, a moving image recording time (Trec) is acquired. Then, the processing proceeds to step S602.

In step S602, determination as to whether the image capture parameter used in the moving image recording is FHD 60 fps is made. When the image capture parameter is FHD 60 fps, the processing proceeds to step S603; otherwise proceeds to step S604.

In step S603, processing of adding the moving image recording time (Trec) of this time to a moving image recording time (TotalTime) accumulated up to that time is performed. Here, in a case where image capture has been performed at FHD 60 fps, the moving image recording time (Trec) is accumulated as it is without being multiplied a coefficient (TotalTime=TotalTime+Trec). The accumulated TotalTime is stored in the non-volatile memory 56. Then, the TotalTime update processing is terminated.

In step S604, determination as to whether the image capture parameter used in the moving image recording is FHD 30 fps is performed. When the image capture parameter is FHD 30 fps, the processing proceeds to step S605; otherwise proceeds to step S606.

In step S605, the processing of adding the moving image recording time (Trec) of this time to the moving image recording time (TotalTime) accumulated up to that time is performed, similarly to step S603. However, in a case where the image capture has been performed at FHD 30 fps, the moving image recording time (Trec) is multiplied by a coefficient (0.9 in the present exemplary embodiment) smaller than a value of FHD 60 fps, where the value is 1, (TotalTime=TotalTime+0.9*Trec). The TotalTime is stored in the non-volatile memory 56. Then, the TotalTime update processing is terminated. That is, the power consumption when the image capture is performed at FHD 30 fps is supposed to be smaller than the power consumption when the image capture is performed at FHD 60 fps. As described above, how the moving image recording time and the temperature rise has a correlation, and thus when the moving image is recorded for the same time, by adding a smaller recording time in the case of FHD 30 fps, a cumulative time is gently increased, which means the temperature is less easily increased.

In step S606, determination as to whether the image capture parameter used in the moving image recording is another size (for example, an HD 30 fps size or a VGA 30 fps size) is made. When the image capture parameter is another size, the processing proceeds to step S607; otherwise, the TotalTime update processing is terminated.

In step S607, the processing of adding the moving image recording time (Trec) of this time to the moving image recording time (TotalTime) accumulated up to that time is performed, similarly to step S603. However, in a case where the image capture has been performed at a smaller size than FHD 30 fps, the moving image recording time (Trec) is multiplied by a coefficient (0.5 in the present exemplary embodiment) smaller than a value of FHD 60 fps, where the value is 1, and is added to the total time (TotalTime=TotalTime+0.5*Trec). The TotalTime is stored in the non-volatile memory 56. Then, the TotalTime update processing is terminated. That is, the power consumption when the image capture is performed at a size smaller than FHD 30 fps is supposed to be smaller than the power consumption when the image capture is performed at FHD 60 fps or FHD 30 fps. Therefore, such processing is performed not to raise the temperature.

As described above, the degree of rise of the temperature of the device can be estimated by changing the adding method according to an image capture pixel (image capture frame rate) (by changing the value of coefficient), in accumulating the moving image recording time. That is, as for the degree of rise of the temperature, whether the temperature is high can be determined using only the cumulative time of the moving image recording without using the temperature sensor. Therefore, there is an advantage that the cost to mount the temperature sensor can be reduced.

Figure 10:
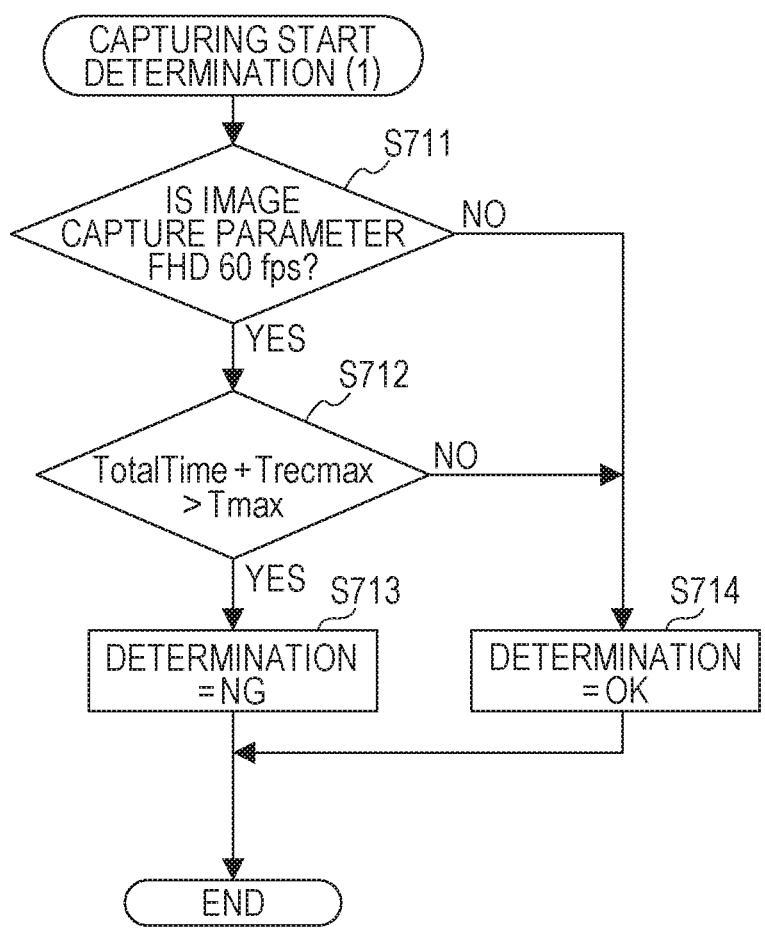
FIG. 10 is a diagram illustrating a processing flow in image capture start determination (1) of an imaging device as an exemplary embodiment of the present invention.

FIG. 10 illustrates details of the "image capture start determination" of step S502 described above.

In step S711, determination as to whether the image capture parameter is FHD 60 fps is made. When the image capture parameter is determined to be FHD 60 fps, the processing proceeds to step S712; otherwise proceeds to step S714.

In step S712, determination as to whether the stored total time of the moving image recording and the Trecmax time exceed a restriction time Tmax (TotalTime+Trecmax>Tmax) is made. When the total time and the Trecmax time are determined to exceed the restriction time Tmax, the processing proceeds to step S713. When the total time and the Trecmax time are determined not to exceed the restriction time Tmax, the processing proceeds to step S714. As described above, exceeding Tmax indicates that the temperature has reached a temperature to watch out for continuous use of the device. Further, when the recording start determination is performed when the TotalTime stored at that time has reached the restriction time and then the recording can be started, the temperature rises thereafter, and will exceed Tmax (that is, exceeds the warning point). Therefore, this case should also be watched out. Therefore, by comparing TotalTime and Tmax by subtracting the moving image recordable maximum time Trecmax of one time, the temperature is controllable without exceeding the warning point.

In step S713, processing of turning an image capture start determination flag OFF is performed. Then, the present determination processing is terminated.

In step S714, processing of turning the image capture start determination flag ON is performed. Then, the present determination processing is terminated.

Looking at the entire flow from steps S711 to S714, the control is performed such that the total time does not exceed Tmax so that the temperature does not exceed the temperature of the warning point. Note that, in step S711, the determination has been made OK in the modes except FHD 60 fps. This is because the temperature does not exceed the temperature of the warning point even if the moving image is recorded long at FHD 30 fps, like FIG. 6A described above. That is, in the image capture parameter setting except FHD 60 fps, the restriction by the total time of the moving image recording is not imposed to let the user not to miss an opportunity for the image capture.

Figure 11:
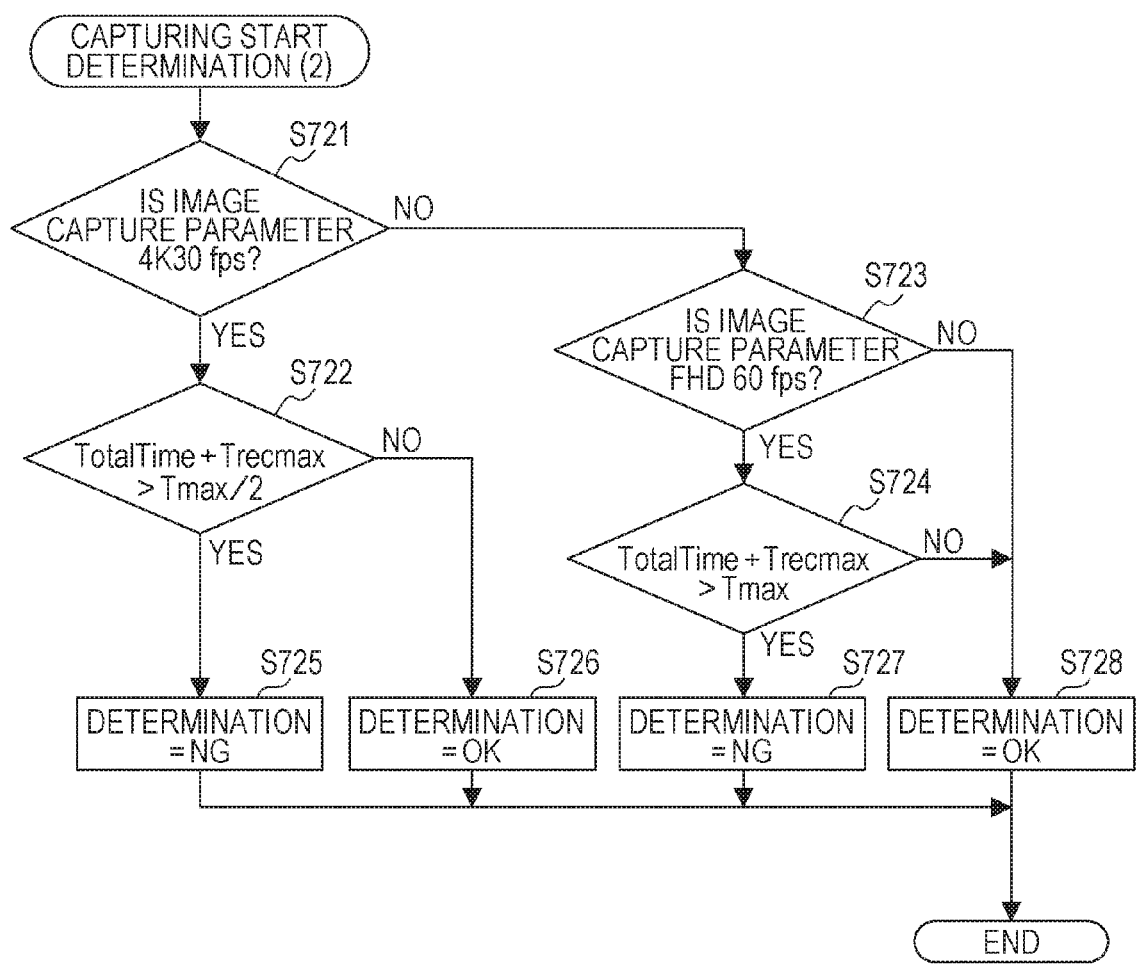
FIG. 11 is a diagram illustrating a processing flow in image capture start determination (2) of an imaging device as an exemplary embodiment of the present invention.

Further, this point of view is slightly changed, and processing like FIG. 11 may be performed.

In FIG. 10, the restriction is imposed on FHD 60 fps only. However, for example, the determination may be controlled to be made NG with a higher probability in the case of a larger size than FHD 60 fps (for example, 4K moving image 30 fps).

In step S721, determination as to whether the image capture parameter is 4K moving image 30 fps is made. When the image capture parameter is determined to be 4K moving image 30 fps, the processing proceeds to step S722; otherwise proceeds to step S723.

In step S722, determination as to whether the total time of the moving image recording stored in the non-volatile memory 56 and the Trecmax time exceed half of the restriction time Tmax (TotalTime+Trecmax>Tmax/2) is made. When the total time and the Trecmax are determined to exceed the half of the restriction time Tmax, the processing proceeds to step S725; otherwise proceeds to step S726. The processing here is similar to the processing in step S712 described above. However, the power consumption in the 4K moving image is larger than the power consumption of the image capture at FHD 60 fps. Therefore, the restriction is made stricter by halving the Tmax time. In doing so, not only in the case where the setting of recording parameter of the moving image is a fixed value like FHD 60 fps, but also in a case of the recording parameter with which the temperature exceeds the temperature of the warning point, the image capture start determination processing of not exceeding the temperature of the warning point becomes possible by varying the Tmax value.

In step S723, determination as to whether the image capture parameter is FHD 60 fps is made. When the image capture parameter is determined to be FHD 60 fps, the processing proceeds to step S724; otherwise proceeds to step S728.

In steps S725 and S727, the determination is made NG, and in steps S726 and S728, the determination is made OK. Then, the present determination processing is terminated.

As described above, the restriction may be imposed on a plurality of recording pixels at the same time, rather than imposing only one recording pixel.

Figure 15:
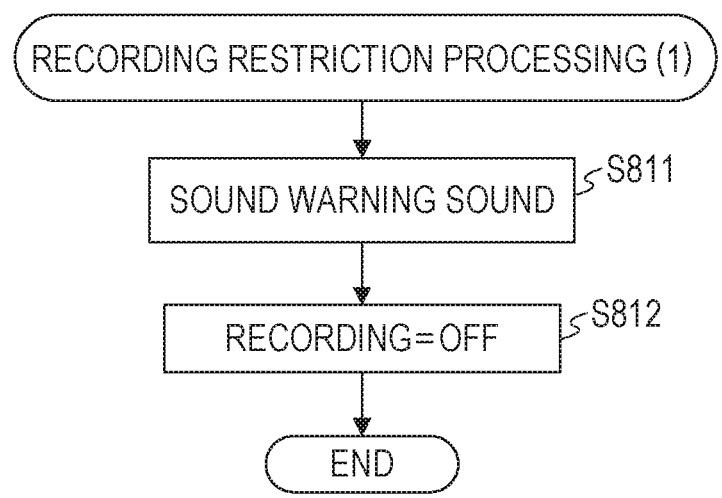
FIG. 15 is a diagram illustrating a processing flow in recording restriction processing (1) of an imaging device as an exemplary embodiment of the present invention.

FIG. 15 illustrates details of the "recording restriction processing" in step S505 described above.

In step S811, processing of sounding warning sound is performed. That is, in the setting of pressing down the moving image button, the warning sound is sounded to notify the user of the fact that the moving image recording is restricted. Then, the processing proceeds to step S812.

In step S812, the recording flag is set to OFF, that is, the image capture prohibition is set. The flag set here is used for the determination in step S506 described above. That is, in the case of FIG. 15, the restriction is imposed, and the recording at FHD 60 fps cannot be performed. In doing so, it becomes possible to control the temperature inside the device not to exceed the temperature of the warning point. Then, the recording restriction processing is terminated.

The recording restriction processing described using FIG. 15 is an example in which no moving image recording can be performed at all. However, for example, the moving image recording may be able to be performed when the recording size has smaller power consumption than FHD 60 fps. An example of that case will be described using FIG. 16 and FIGS. 18(1) to 18(4).

Figure 16:
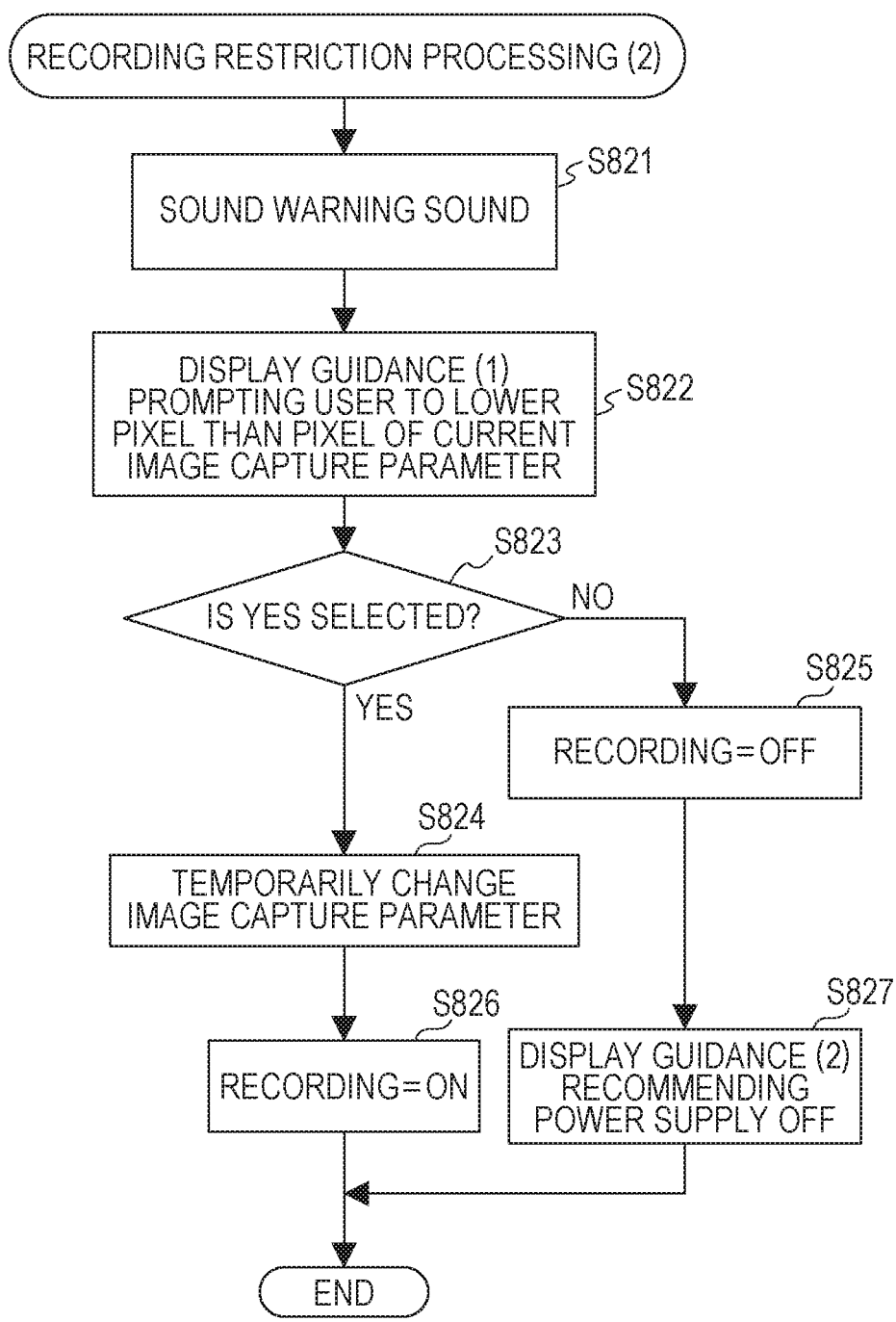
FIG. 16 is a diagram illustrating a processing flow in recording restriction processing (2) of an imaging device as an exemplary embodiment of the present invention.

FIG. 16 illustrates details of the "recording restriction processing" of step S505 described above.

In step S821, the warning sound processing is performed similarly to step S811. Then, the processing proceeds to step S822.

In step S822, a guidance that guides whether the moving image recording is to be performed with a smaller pixel than the currently set recording pixel size is displayed. In the case of this example, FIG. 18(1) illustrates an image capture standby state where the set recording size is FHD 60 fps. When the moving image button is pressed down like step S501 described above, the moving image recording cannot be performed in the determination of step S503, and the warning sound is sounded, and the guidance as to whether the moving image recording is to be performed at FHD 30 fps, like FIG. 18(2), is displayed. FHD 30 fps has a lower pixel than FHD 60 fps. Then, the processing proceeds to step S823.

In step S823, determination as to whether "YES" has been selected on the guidance screen of step S822 is made. When "YES" has been selected, the processing proceeds to step S824, and when "NO" has been selected, the processing proceeds to step S826.

In step S824, the currently set image capture parameter is temporarily changed. Here, the image capture parameter originally set to FHD 60 fps is temporarily changed to FHD 30 fps. Then, the processing proceeds to step S825.

In step S825, the recording flag is set to ON. That is, when the processing is kept performed, the moving image recording at FHD 30 fps can be performed in the determination of step S506. At this time, the setting of the image capture parameter is temporarily set to FHD 30 fps, and the moving image recording can be started, like FIG. 18(3).

In step S826, the recording flag is set to OFF. That is, even if the processing is continued, the restriction is imposed, and the recording at FHD 60 fps cannot be performed. Then, the processing proceeds to step S827.

Figure 18:
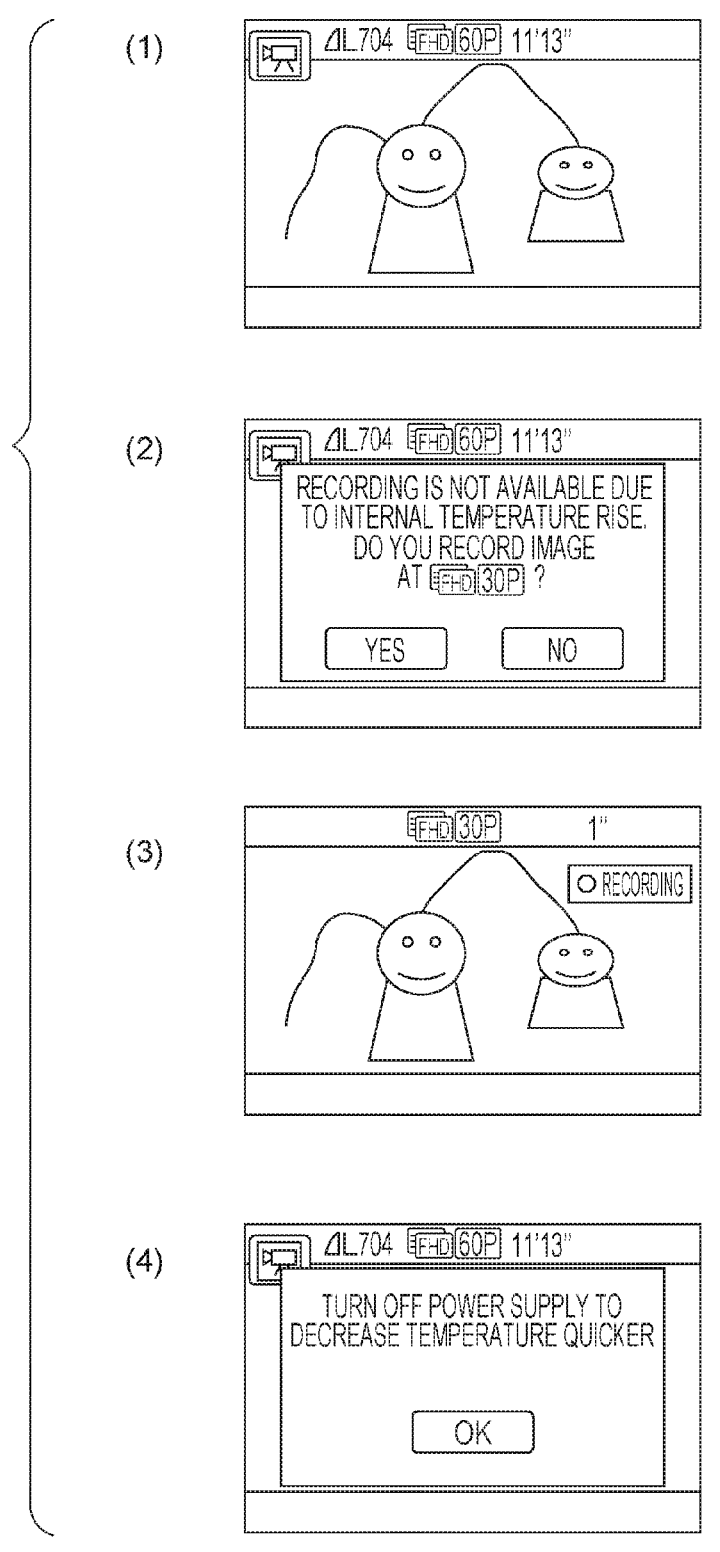

In step S827, a guidance screen that recommends OFF of the power supply of the device, like FIG. 18(4), is displayed. When the OK button is pressed on the screen, the processing is set to an image capture standby state. A case to proceed to step S827 is a case where the temperature inside the device is high. Therefore, by displaying such a guidance that recommends OFF of the power supply, a method of easily performing the next image capture at FHD 60 fps can be presented to the user.

Further, in the processing of FIGS. 8 and 16, in the present exemplary embodiment, the image capture at FHD 30 fps is allowed in a case where the image capture at FHD 60 fps cannot be performed. These FHD 60 fps and FHD 30 fps have hierarchical relationship in the moving image frame rate in terms of the image capture parameter. Similarly, for example, the present exemplary embodiment may be similarly applied to noise reduction processing of a moving image, instead of the frame rate. That is, in a case where the noise reduction processing of the moving image is set to "large", when the internal temperature of the device main body is near the temperature of the warning point, the setting of the noise reduction processing is temporarily changed from "large" to "small", so that the moving image capture is allowed. This point of view may be applied to any image capture parameters having the hierarchical relationship in the moving image recording pixel, a drive method, or the like.

Further, if the condition is partially met by temporarily changing the moving image recordable maximum time Trecmax in one-time operation without evenly restricting the moving image recording, the recording is allowed, and in other cases, the recording may be restricted. An example of that case will be described using FIG. 17.

Figure 17:
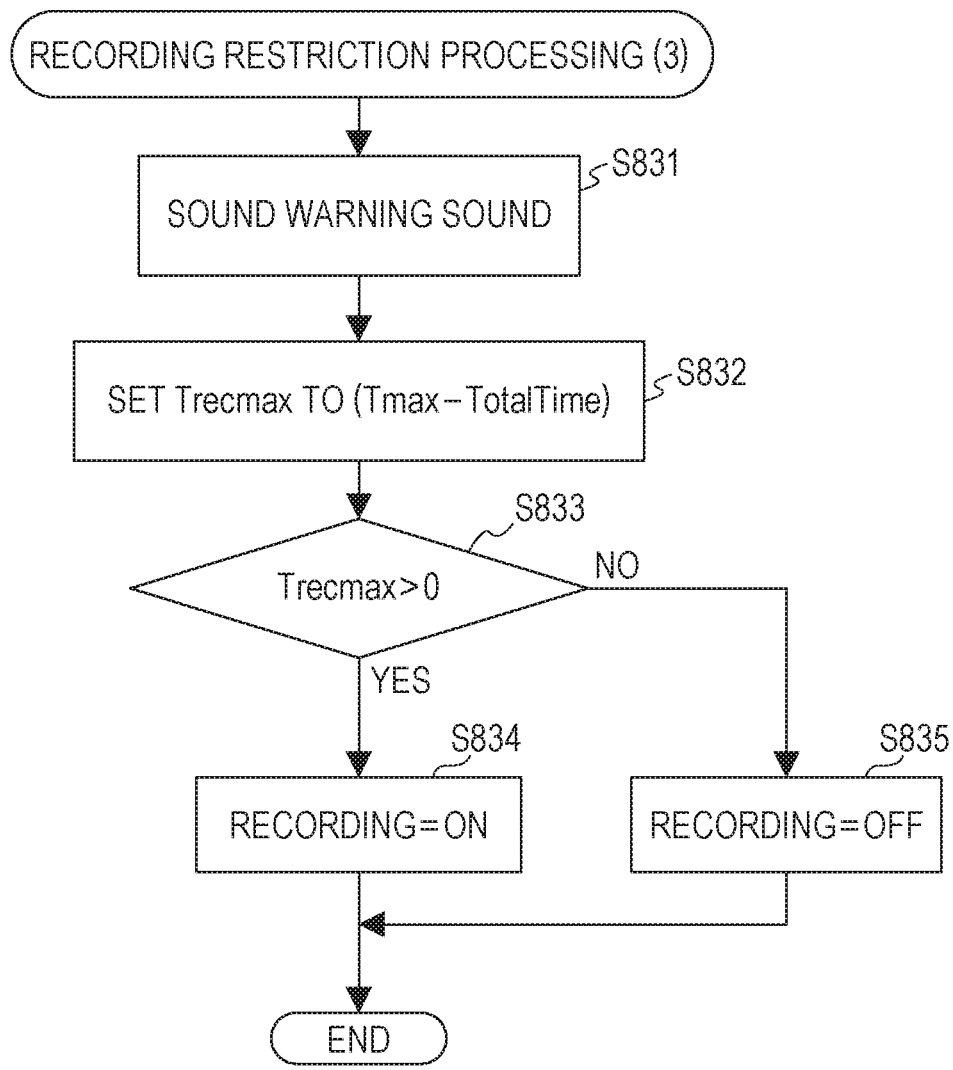
FIG. 17 is a diagram illustrating a processing flow in recording restriction processing (3) of an imaging device as an exemplary embodiment of the present invention.

FIG. 17 illustrates details of the "recording restriction processing" of step S505 describe above.

In step S831, the warning sound processing is performed, similarly to step S811. Then, the processing proceeds to step S832.

In step S832, a value obtained by subtracting TotalTime held in the non-volatile memory 56 at that time from the restriction time Tmax is set to the moving image recordable maximum time Trecmax in one-time operation. For example, as described above, in the case of FHD 60 fps, Trecmax=10 minutes. In a case where Tmax is 21 minutes and TotalTime is 17 minutes, the setting of the value of Trecmax is changed from 10 minutes to 4 minutes (21−17). Then, the processing proceeds to step S833.

In step S833, determination as to whether Trecmax is a positive value is made. When Trecmax is a positive value, the processing proceeds to step S834, and the recording flag is set to ON. When Trecmax is not a positive value, the processing proceeds to step S835, and the recording flag is set to OFF. In step S833, whether Trecmax is a positive value being determined is because Trecmax may become not a positive value due to the processing of step S832, depending on a condition when the moving image recording is started. Trecmax being not a positive value indicates that a possibility that the temperature inside the device main body rises is high. Therefore, it is desirable to impose the restriction not to allow the recording.

In the restriction method of FIG. 16, the temperature of the device main body needs to be low that allows recording of the moving image recordable maximum time Trecmax in one-time operation when the moving image recording is started. In the restriction method of FIG. 17, although the Trecmax time is dynamically changed in every image capture, there is an advantage that the moving image recording can be started even at the temperature of the device main body, which barely avoids exceeding the warning point.

In doing so, heat generation of the device can be detected without using the temperature sensor, and thus there is an advantage that the design cost of the device can be reduced.

In the exemplary embodiment described so far, whether the moving image recording can be started is determined in step S502, and when the recording can be started, the moving image recording is started, and then the moving image recording is terminated. Then, the "TotalTime update processing" of adding the time used to record the moving image at that time to TotalTime stored in the non-volatile memory 56 is performed. Further, in the recording start determination processing, whether TotalTime exceeding the restriction time Tmax being monitored has been described.

As described above, whether the temperature of the device main body is high can be estimated and whether the recording can be started can be determined by focusing attention on the total time TotalTime. This is an advantage that the temperature state can be grasped without using the temperature sensor.

However, in a case of performing image capture start determination only by the processing, there is a disadvantage that TotalTime stored in the non-volatile memory 56 cannot be returned to 0. Further, the TotalTime may be returned to 0 every time the power supply is turned OFF. However, if the power supply is immediately turned ON and the moving image capture is performed when the device main body has a high temperature, the temperature may exceed the temperature of the warning point due to the high temperature. Therefore, as a method of solving this problem, "image capture start determination" as illustrated in FIG. 12 is performed.

Figure 12:
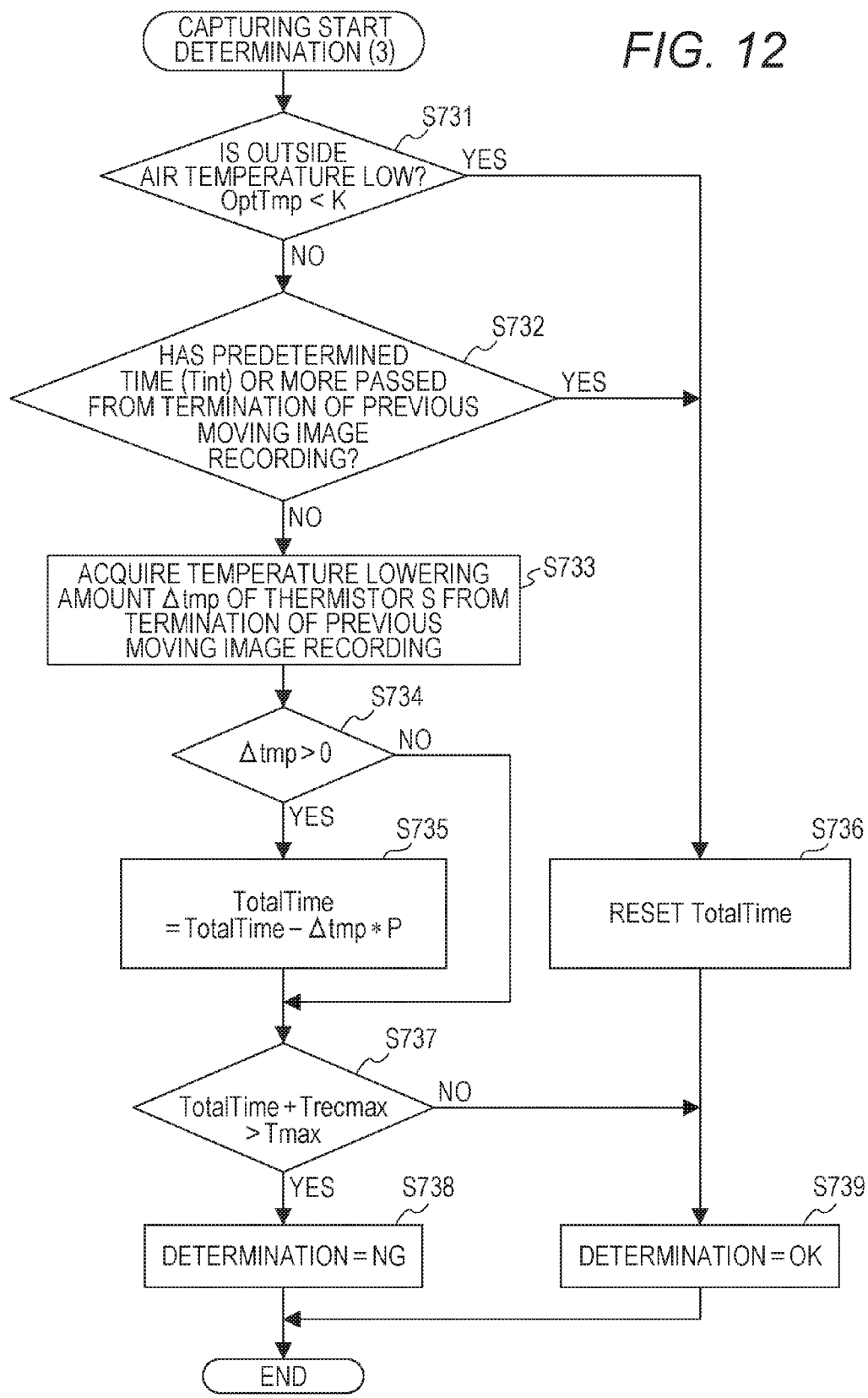
FIG. 12 is a diagram illustrating a processing flow in image capture start determination (3) of an imaging device as an exemplary embodiment of the present invention.

FIG. 12 illustrates details of the "image capture start determination" in step S502 described above.

In step S731, determination as to whether an outside air temperature at the point of time when the moving image recording is started is low is made. To measure the outside air temperature, the above-described temperature sensor 92 is used. Determination of whether a value OptTmp acquired by the temperature sensor 92 when the moving image recording is started is smaller than a predetermined temperature K (OptTmp<K) is made. When the value OptTmp is determined to be smaller than the predetermined temperature K, the processing proceeds to step S736, when the value OptTmp is determined to be larger than the predetermined temperature K, the processing proceeds to step S732.

In step S732, determination as to whether an interval time (Tint) from when the previous moving image recording is terminated to when the moving image button is pressed down this time has passed a predetermined time or more is made. In the present exemplary embodiment, the predetermined time is 30 minutes. When the interval time has passed the predetermined time, the processing proceeds to step S736, and when the interval time has not passed the predetermined time, the processing proceeds to step S733.

In step S733, a difference in the value of the temperature sensor 91 from when the previous moving image recording is terminated to when the moving image button is pressed down this time (a temperature lowering amount ΔTmp) is acquired. Then, the processing proceeds to step S734.

In step S734, determination as to whether the value of ΔTmp acquired in step S733 is a positive value (whether the temperature lowering amount is 0 or more), that is, whether the temperature inside the main body is lowered, compared with the temperature when the previous moving image recording is started, is made. When the value of ΔTmp is a positive value, that is, when the temperature inside the main body is determined to be lowered, the processing proceeds to step S735. When the value of ΔTmp is not a positive value, that is, when the temperature inside the main body is determined not to be lowered, compared with the temperature when the previous moving image recording is terminated, the processing proceeds to step S737 (step S735 is skipped).

In step S735, subtraction processing (TotalTime−ΔTmp*P) of subtracting a value obtained by multiplying the temperature lowering amount ΔTmp acquired in step S733 by a total time subtraction coefficient P, from the total time TotalTime of the moving image recording held in the non-volatile memory 56 is performed. Then, the processing proceeds to step S737.

In step S736, the total time TotalTime of the moving image recording held in the non-volatile memory 56 is reset to 0. Then, the processing proceeds to step S739.

In steps S737 to S739, similarly to the processing in steps S712 to S714 described above, determination as to whether the stored total time of the moving image recording and the Trecmax time exceed the restriction time Tmax (TotalTime+Trecmax>Tmax) is made. The processing is similar and thus description is omitted. Then, the image capture start determination processing is terminated.

In step S731, the reason for performing the processing of confirming the outside air temperature and resetting TotalTime to 0 in step S736 will be described using FIG. 19.

Figure 19:
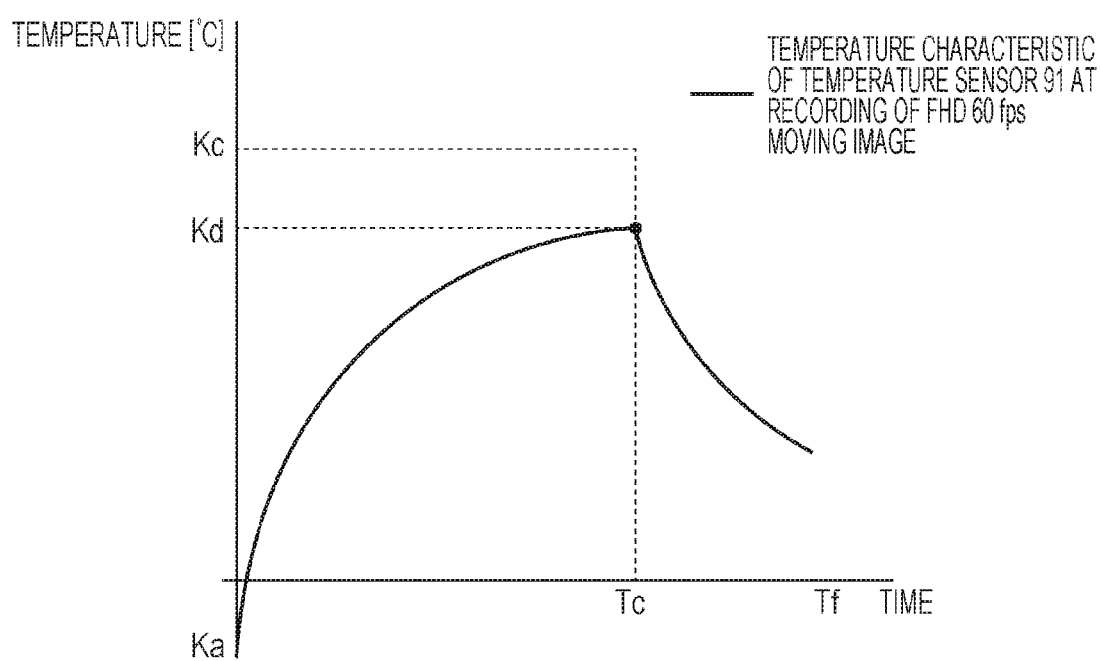
FIG. 19 is a diagram illustrating a temperature characteristic of the temperature sensor 91 when moving image recording is performed at FHD 60 fps.

FIG. 19 is a diagram illustrating temperature change when the moving image recording is started from the state of the room temperature Ka [° C.], similar to FIG. 4A, and the moving image recording is then repeated until when the battery is dead. A different point in FIG. 19 is that the image capture is started at the room temperature Ka [° C.] that is clearly lower than the room temperature of FIG. 4A. When the moving image recording is started, the output value of the sensor rises as time proceeds. In the case of FIG. 19, the temperature Kd [° C.] does not exceed the temperature Kc [° C.] of the warning point. This means that an ambient environment in which the moving image recording is performed has a temperature that is lower than a certain threshold, the temperature does not exceed the temperature of the warning point even if the moving image recording is repeatedly performed until when the battery is dead. Therefore, in such an environment, even if the total time held in the non-volatile memory 56 is going to exceed the restriction time Tmax and the moving image recording is performed, it can be predicted that the temperature of the device main body does not exceed too much. Further, as for the total time spent to record the moving image, if the room temperature Ka when the moving image recording is started is low, the temperature inside the device main body is supposed to be lowered except a special case. Therefore, the moving image recording total time can be reset to 0. Therefore, when the temperature is low as described above (when the outside air is lower than a certain threshold), start of the moving image capture can be allowed without any condition. By performing the control as described above, there is an advantage that the temperature of the device main body can be accurately estimated using the total time spent to record the moving image.

Further, the reason for performing the processing of resetting TotalTime to 0 in step S736 if the interval time from when the previous moving image recording is terminated in step S732 has passed a predetermined time or more will be described using FIGS. 20A and 20B.

Figure 20A:
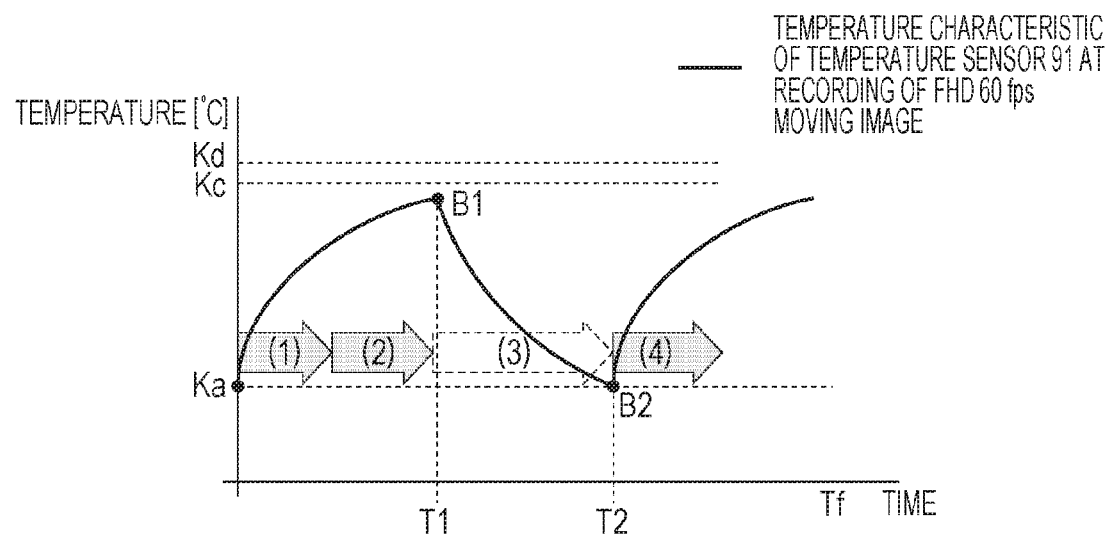
FIG. 20A is a diagram illustrating a temperature characteristic of the temperature sensor 91 when power supply is turned OFF after the moving image recording is performed at FHD 60 fps, and then the moving image recording is resumed.
Figure 20B:
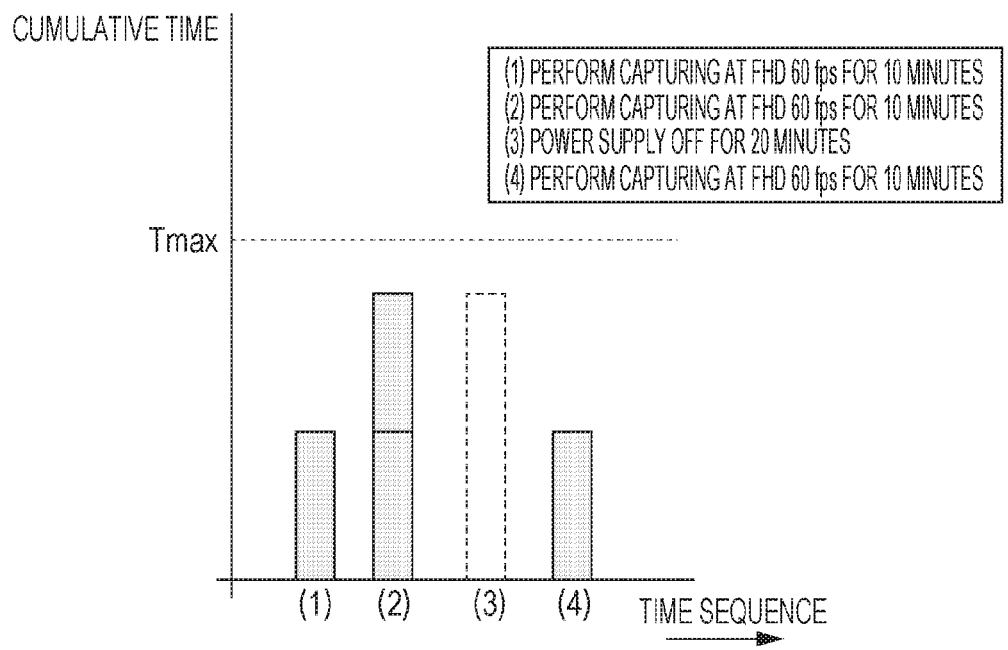
FIG. 20B is a diagram illustrating a transition of a moving image recording total time when the operation illustrated in FIG. 20A is performed.

FIG. 20A is a diagram illustrating a temperature characteristic of the temperature sensor 91 when the moving image recording is performed at FHD 60 fps for 10 minutes is performed twice from the state of the room temperature Ka [° C.], then the power supply of the device main body is turned OFF for 20 minutes, and then the moving image capture is performed at FHD 60 fps for 10 minutes. From this diagram, it is found that the temperature is lowered when the power supply is turned OFF after the moving image recording is performed twice (B1 state). It is found that, after a period of time from when the temperature starts to be lowered (B2 state), the temperature is decreased to the room temperature Ka (see the Tint=T2−T1 period). As described above, the temperature and the total time of the moving image recording have relationship. Therefore, when the output value of the temperature sensor 91 is decreased to the same temperature of when the moving image recording is started, the total time can be reset. The transition of the total time of the moving image recording is illustrated in FIG. 20B. That is, when the operation as illustrated in FIG. 20A is performed, the total time finally becomes 10 minutes. Further, FIG. 20A illustrates an example in which the power supply is turned OFF during the period from T1 to T2. However, the time to browse the images in the playback mode without turning OFF the power supply may be included. As described above, in the present exemplary embodiment, the total time is reset to 0 when the interval time (Tint) has passed the predetermined time that is 30 minutes. The 30 minutes can be considered to be an enough time to decrease the temperature of the device main body to the room temperature Ka. As described above, the start of the moving image capture is allowed without any condition if the predetermined time or more has passed from the previous moving image recording. Therefore, there is an advantage that the temperature of the device main body can be accurately estimated using the total time spent to record the moving image.

Further, the reason for performing the processing of subtracting the total time TotalTime on the basis of the temperature lowering amount inside the main body in step S735 will be described using FIGS. 21A and 21B.

Figure 21A:
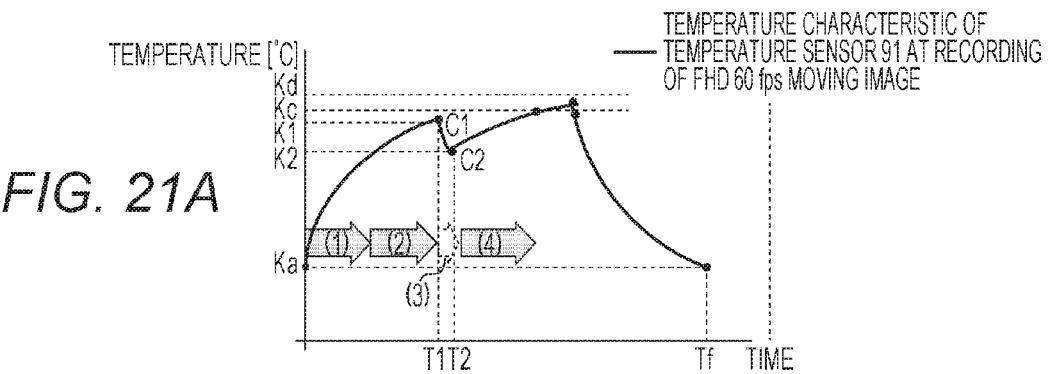
FIG. 21A is a diagram illustrating a temperature characteristic of the temperature sensor 91 when power supply is turned OFF after the moving image recording is performed at FHD 60 fps, and then the moving image recording is resumed.
Figure 21B:
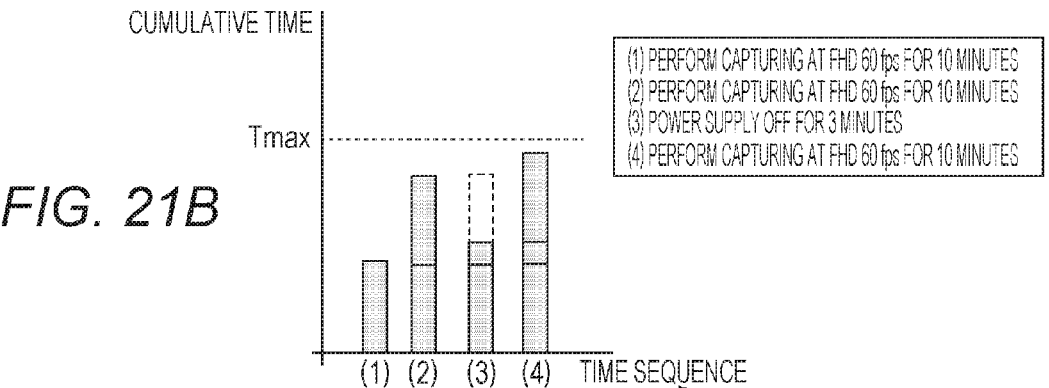
FIG. 21B is a diagram illustrating a transition of a moving image recording total time when the operation illustrated in FIG. 21A is performed.

FIG. 21A is a diagram illustrating a temperature characteristic of the temperature sensor 91 when the moving image recording at FHD 60 fps for 10 minutes is performed twice from the state of the room temperature Ka [° C.], then the power supply of the device main body is turned OFF for 3 minutes, then the moving image capture is performed at FHD 60 fps for 10 minutes. From this diagram, it is found that the temperature is lowered when the power supply is turned OFF after the moving image recording is performed twice (C1 state). When 3 minutes has passed from when the temperature starts to be lowered (C2 state), it is found that the temperature is decreased from K1 [° C.] to K2 [° C.](see the Tint=T2−T1 period). As described above, the value of the temperature sensor 91 and the total time of the moving image recording have relationship. Therefore, when the operation illustrated in FIG. 21A is performed, the transition of the total time of the moving image recording can be illustrated in FIG. 21B. Here, a mechanism to subtract the total time in FIG. 21B(3) will be described.

A temperature lowering amount decreased from K1 [° C.] to K2 [° C.] can be expressed by ΔTmp (=K1−K2), as described above. When the temperature is decreased, the moving image recordable time should be increased by the decrease. Therefore, how much the temperature decrease increases the moving image recordable time by how much (how much the total time of the moving image recording can be subtracted) needs to be indicated by an index. The data used here is the above-described points A1, A2, A4, and A5 in FIG. 4A.

Focusing attention on the points A1 and A2, "an index about how many minutes are required for the moving image recording to raise the temperature by 1° C." is obtained using the relationship between the temperature reaching around immediately before the warning point Kc [° C.] and the time. This index is used as the above-described total time subtraction coefficient P. That is, when the temperature lowering amount ΔTmp is multiplied by P, how long the moving image can be recorded by the lowering of the temperature can be calculated. By subtracting the value of "ΔTmp×P" from the total time TotalTime of the moving image recording stored in the non-volatile memory 56, if the temperature is decreased even if only slightly, the possibility that the next moving image recording can be performed becomes high, even immediately after the moving image recording has been performed at a high temperature. Then, how much the temperature decrease after the time has reached the restriction time Tmax makes the moving image recording available by the next Trecmax time is indicated by the temperature lowering amount from the point A4 to the point A5 after the power supply OFF. It can be read that if the temperature is decreased from the point A4 to the point A5, the temperature does not reach the temperature Kc of the warning point even if the image capture is performed afterward for the Trecmax time.

As described above, by performing the processing of subtracting the total time TotalTime on the basis of the temperature lowering amount inside the main body, the restriction of the start of the moving image recording can be relieved.

As described above, in a case where a predetermined condition is met when the moving image recording is started, the processing of subtracting the time used to record the moving image (cumulative time) is performed (cumulative time subtraction processing unit), and the restriction of the start of the moving image recording is relieved, so that the means and method of accurately detecting heat generation can be provided.

Figure 13:
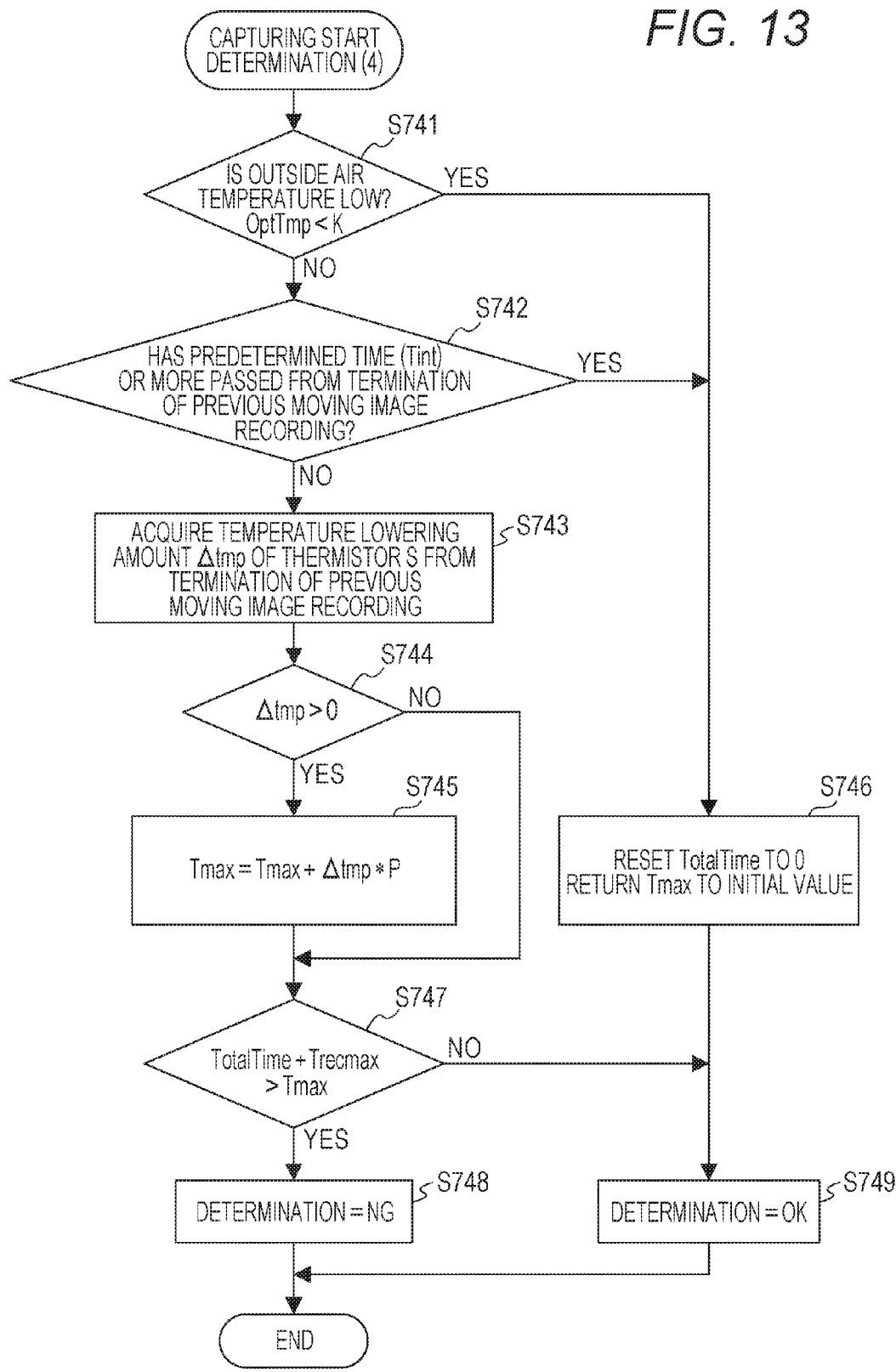
FIG. 13 is a diagram illustrating a processing flow in image capture start determination (4) of an imaging device as an exemplary embodiment of the present invention.

Further, the "image capture start determination" may be performed like FIG. 13.

FIG. 13 illustrates details of the "image capture start determination" of step S502 describe above.

Processing of steps S741 to S744 is similar to the processing of steps S731 to S734 described above, and thus description is omitted.

In step S745, processing of adding a value, which is obtained by multiplying the temperature lowering amount ΔTmp acquired in step S743 by the total time subtraction coefficient P, to the restriction time Tmax (Tmax+ΔTmp*P) is performed. Then, the processing proceeds to step S747.

In step S746, the total time TotalTime of the moving image recording held in the non-volatile memory 56 is reset to 0, and the restriction time Tmax is reset to the initial value. Then, the processing proceeds to step S749.

Processing of steps S747 to S749 is similar to the processing of steps S712 to S714 described above, and thus description is omitted.

Figure 21C:
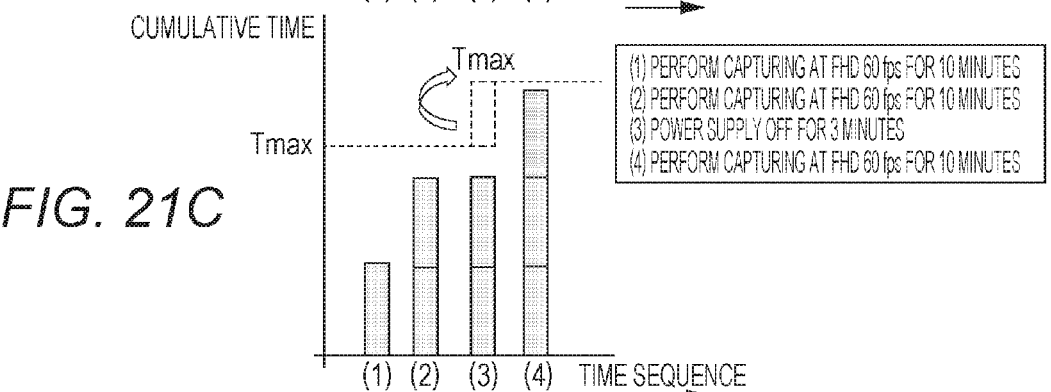
FIG. 21C is a diagram illustrating a transition of the moving image recording total time, which is different from the case of FIG. 21B when the operation illustrated in FIG. 21A is performed.

The reason for performing the restriction time Tmax adding processing on the basis of the temperature lowering amount inside the main body in step S745 will be described using FIGS. 21A and 21C.

Description of FIG. 21A has been described and is thus omitted. As described so far, the value of the temperature sensor 91 and the total time of the moving image recording have relationship. Therefore, when the operation illustrated in FIG. 21A is performed, the transition of the total time of the moving image recording can be illustrated in FIG. 21C. In FIG. 21C(3), the restriction time Tmax is temporarily increased, that is, the restriction time is changed in a direction of being relieved, instead of subtracting the total time in FIG. 21B(3). After that, the moving image at FHD 60 fps of FIG. 21B(4) can be recorded for 10 minutes, which is similar in FIG. 21B and FIG. 21C. As describe above, by performing the restriction time Tmax adding processing on the basis of the temperature lowering amount inside the main body, the restriction of the moving image recording start can be relieved.

Further, in step S742, the reason for performing the processing of resetting TotalTime to 0 in step S746, an returning Tmax to the initial value, if the interval time from the time when the previous moving image recording is terminated has passed a predetermined time or more will be described using FIG. 21D.

Figure 21D:
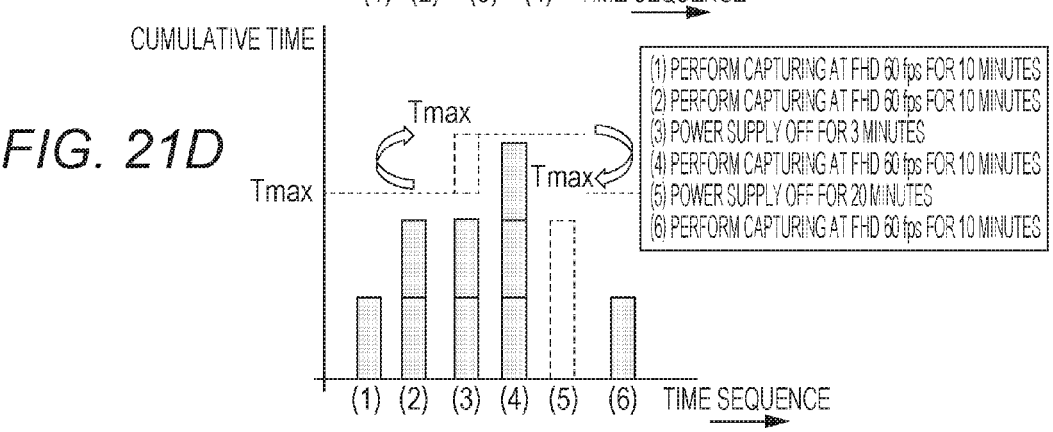
FIG. 21D is a diagram illustrating a transition of the moving image recording total time when the power supply is turned OFF after the moving image recording is performed at FHD 60 fps, and then the moving image recording and the turning OFF of the power supply are repeated.

FIG. 21D illustrates the transition of the total time of the moving image recording when the power supply of the device main body is turned OFF for 20 minutes following after the procedure of FIG. 21A describe above is performed, and then the moving image capture is performed at FHD 60 fps for 10 minutes. It is known that, as described in FIG. 20A, the temperature is lowered from the temperature (Kc) near the warning point to the initial temperature (the temperature Ka of the room temperature), if the time of power supply OFF is 20 minutes. The value of the temperature sensor 91 and the total time of the moving image recording has relationship. Therefore, if there are 20 minutes of the period of power supply OFF, the total time of the moving image recording can be reset. As for the temporarily increased restriction time Tmax, the temperature is returned to an initial state, and thus initialization can be performed.

As described above, the restriction time Tmax is temporarily increased on the basis of the temperature lowering amount inside the main body. Then, if a certain time has passed after the moving image recording termination, the temporarily increased restriction time Tmax is returned to the original state, and the total time TotalTime is also reset, so that the restriction of the moving image recording start can be relieved.

As described above, in a case where the time used to record the moving image (cumulative time) is a predetermined time or more, the threshold to impose the restriction on the moving image recording is relieved (the numerical value of the predetermined time is increased), so that the means and method of accurately detecting heat generation can be provided.

Figure 14:
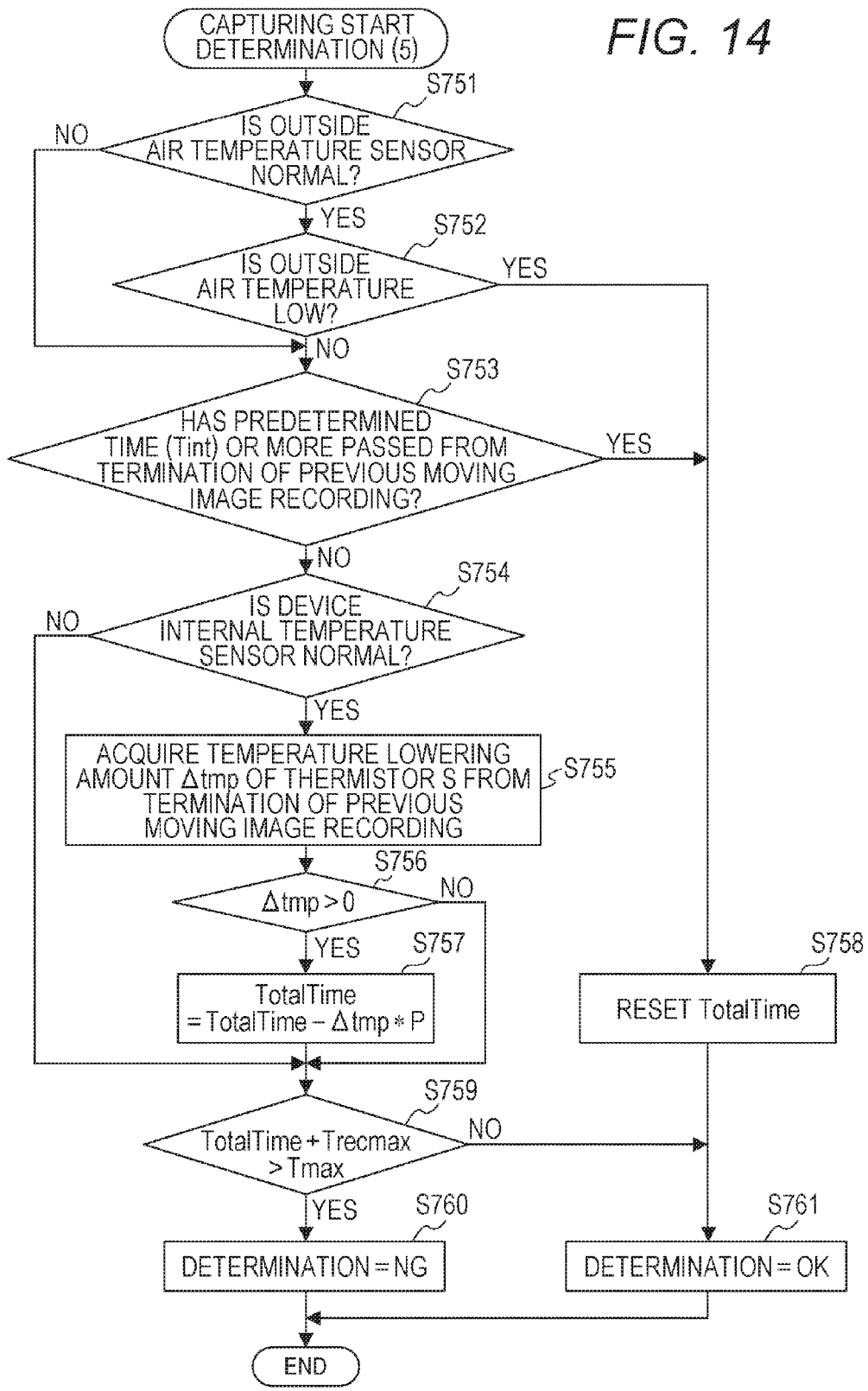
FIG. 14 is a diagram illustrating a processing flow in image capture start determination (5) of an imaging device as an exemplary embodiment of the present invention.

Further, the "image capture start determination" may be performed like FIG. 14.

FIG. 14 illustrates details of the "image capture start determination" of step S502 described above.

In step S751, determination as to whether the temperature sensor for outside air temperature measurement is normal is made. The temperature sensor for outside air temperature measurement referred here is the above-described temperature sensor 92. When the output value of the temperature sensor 92 is normal, the processing proceeds to step S752, and when the output value is abnormal, the processing proceeds to step S753 (step S752 is skipped).

Step S753 is similar to step S732 or S742 described above, and thus description is omitted.

In step S754, determination as to whether the temperature sensor for device internal temperature measurement is normal is made. The temperature sensor for device internal temperature measurement referred here is the above-described temperature sensor 91. When the output value of the temperature sensor 91 is normal, the processing proceeds to step S755, and when the output value is abnormal, the processing proceeds to step S759.

Processing of steps S755 to S761 is similar to the processing of steps of S733 to S739 described above, and thus the description is omitted.

As detected whether the temperature sensors are normally operated in steps S751 and S754, in a case where the temperature sensors are broken, the processing of resetting or subtracting TotalTime is not performed. However, the processing of step S753 is always valid regardless of the temperature sensor. Therefore, even if the temperature sensors are broken, high temperature due to heat generation is detectable, and there is an advantage that the restriction can be imposed on the use of the device due to heat generation even if the temperature sensors are broken.

Further, the determination of whether the temperature sensors are normal in steps S751 and S754 may include not only the "error values" of the output values from the temperature sensors 91 and 92, but also higher values or lower values than a certain predetermined temperature.

As described above, accurate heat generation detection becomes possible by performing the processing as described above. Therefore, there is an effect of not imposing the restriction, if the internal temperature of the device is decreased, without shutting down the power supply after the moving image capture is performed many times.

Second Exemplary Embodiment

Figure 22A:
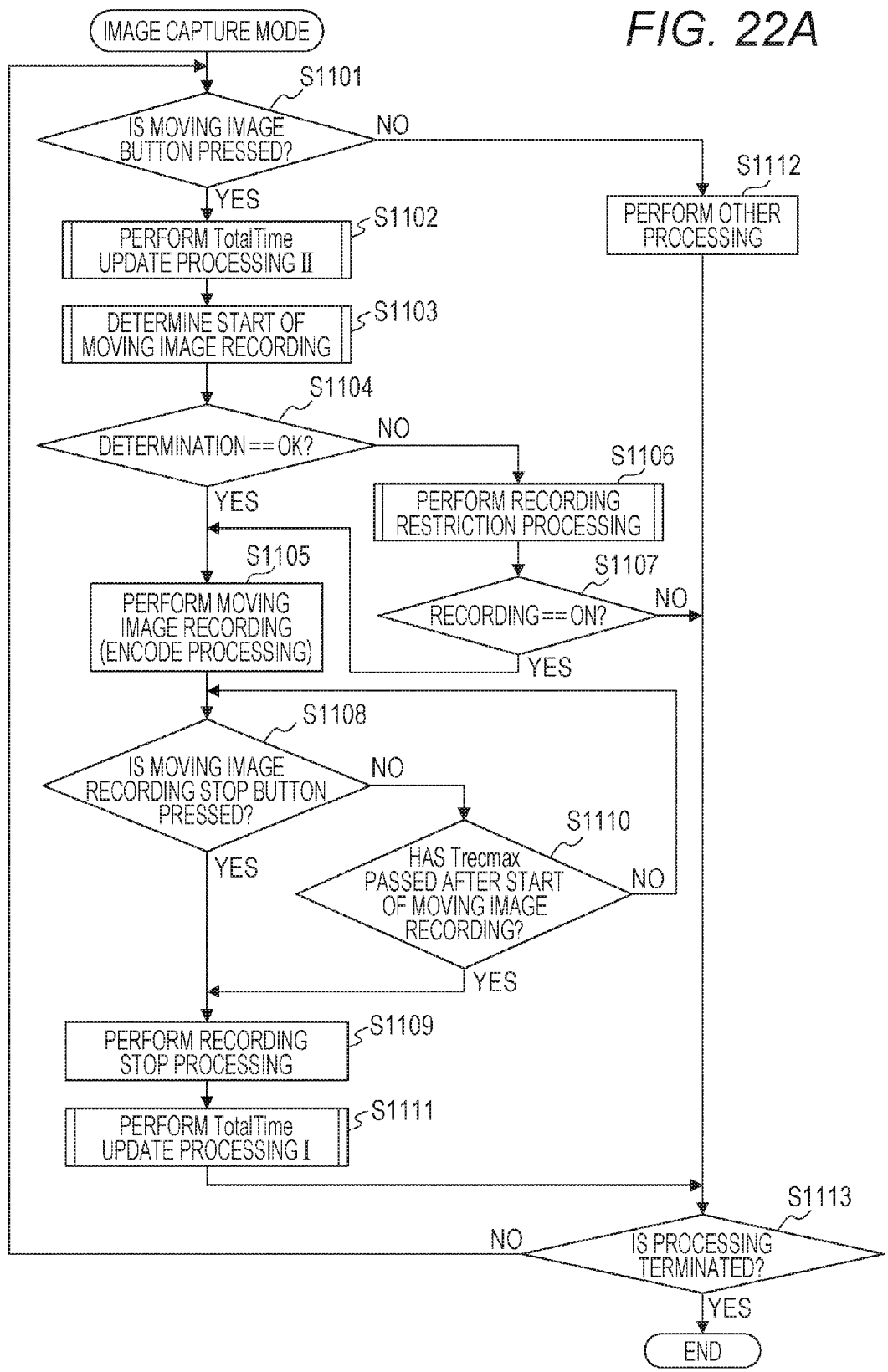
FIG. 22A is a diagram illustrating a processing flow (second exemplary embodiment) in an image capture mode, of an imaging device as an exemplary embodiment of the present invention.

FIG. 22A is a flowchart illustrating processing in an image capture mode, which is an optimum embodiment as a second exemplary embodiment of the present invention. In the processing here, moving image recording will be mainly described.

In step S1101, determination as to whether a moving image button has been pressed down is made, similarly to step S501. When the moving image button is determined to be pressed down, the processing proceeds to step S1102, and when the moving image button is not pressed down, the processing proceeds to step S1112.

In step S1102, TotalTime update processing is performed. Description will be given below. Then, the processing proceeds to step S1103.

Processing of steps S1103 to S1113 is similar to the processing of steps S502 to S512 described above, and thus description is omitted. Then, image capture mode processing is terminated.

FIG. 22B illustrates details of total time update processing, the total time being held in a non-volatile memory 56 immediately after the moving image button is pressed down in step S1101.

In step S1201, an interval time (Tint) from when previous moving image recording is terminated to when the moving image button is pressed down this time is acquired. Then, the processing proceeds to step S1202.

In step S1202, determination as to whether a recording size of a currently set image capture parameter is FHD 60 fps is made. When the recording size is FHD 60 fps, the processing proceeds to step S1203; otherwise the present processing is terminated without updating TotalTime.

In step S1203, a ratio (D) of the time staying in an image capture standby state during the interval period (Tint) is acquired. Then, the processing proceeds to step S1204.

In step S1204, the ratio of time staying in the image capture standby state is integrated in Tint and Tint is updated. Then, the processing proceeds to step S1205.

In step S1205, processing of adding the time (Tint) staying in the moving image standby state of this time to the moving image recording time (TotalTime) is performed. Note that the time (Tint) is multiplied by a coefficient (0.1 in the present exemplary embodiment) smaller than a value of a recording time at FHD 60 fps, where the value is 1, and the obtained value is added to the total time (TotalTime=TotalTime+0.1*Tint). TotalTime is stored in the non-volatile memory 56. Then, the TotalTime update processing is terminated.

Figure 22C:
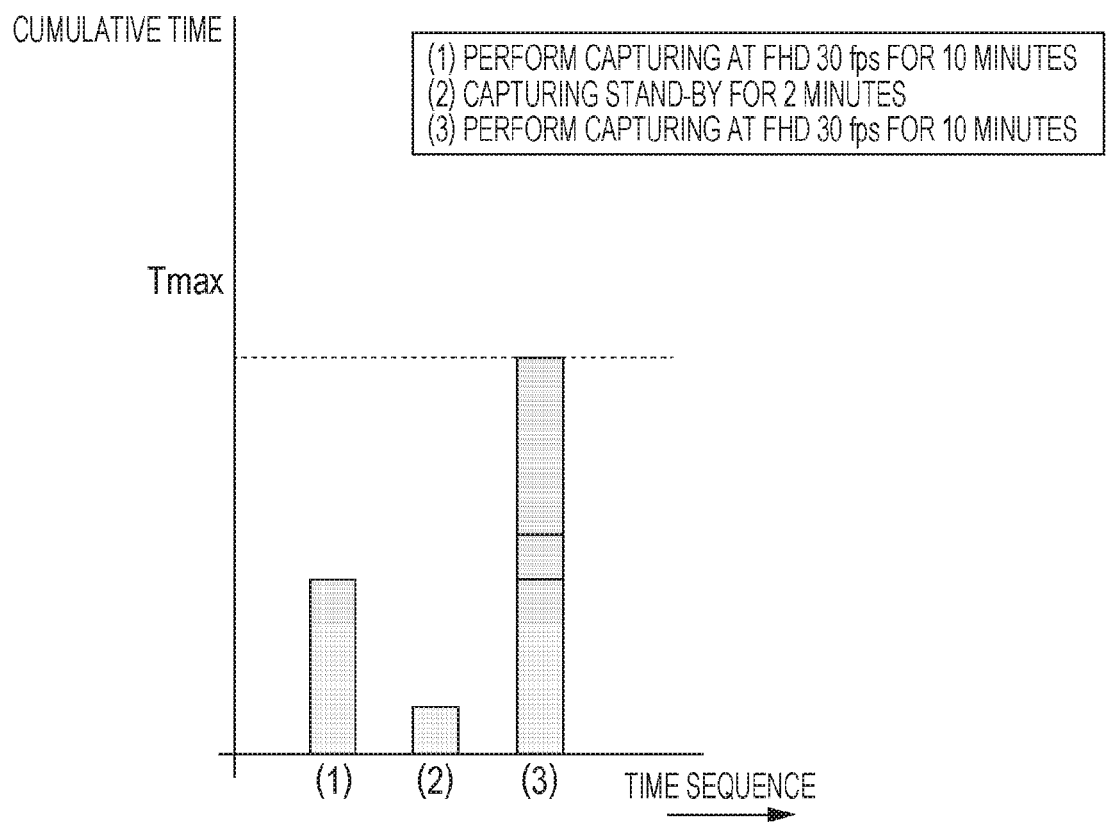
FIG. 22C is a diagram illustrating a transition of a moving image recording total time when an operation to resume moving image recording is performed after waiting in an image capture standby state without turning OFF power supply after the moving image recording is performed at FHD 60 fps.

Here, the reason for updating the total time even when it is the set standby state of FHD 60 fps, and the moving image is not being recorded is because the temperature of a device main body rises due to heat generation even if the moving image recording is not performed. FIG. 22C illustrates that not only the moving image recording, but also the moving image standby time is also included in the total time. As described above, by adding the time in the standby state where the moving image recording is not being performed to the total time, more accurate temperature determination than the case of the first exemplary embodiment becomes possible without using a temperature sensor.

Third Exemplary Embodiment

Figure 23A:
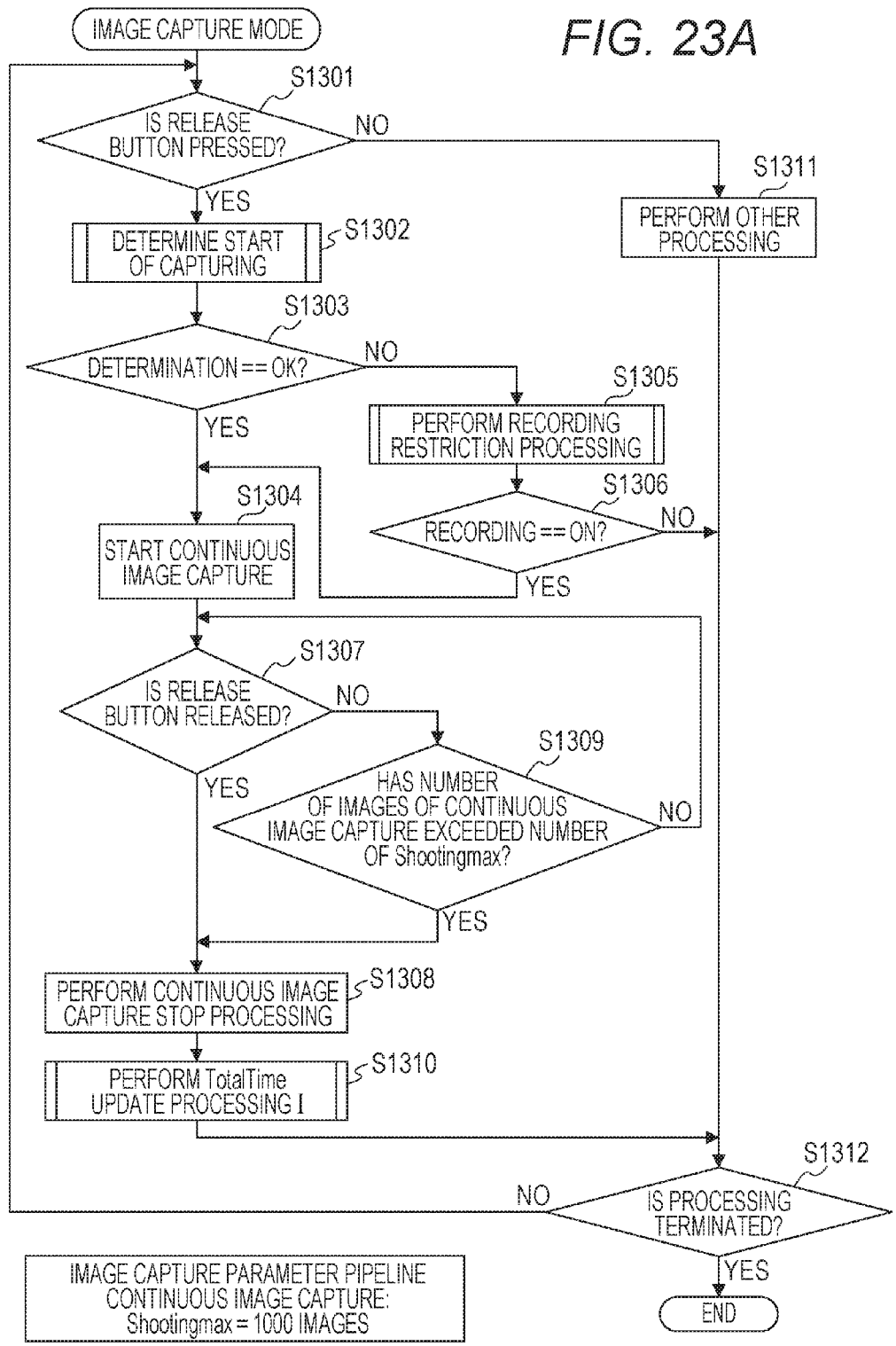
FIG. 23A is a diagram illustrating a processing flow (third exemplary embodiment) in an image capture mode, of an imaging device as an exemplary embodiment of the present invention.

FIG. 23A is a flowchart illustrating processing in an image capture mode, which is an optimum embodiment as a third exemplary embodiment of the present invention. In the processing here, continuous image capture will be mainly described. As a precondition, drive setting that is a part of image capture parameters (single image capture or continuous image capture) is set to continuous image capture.

In step S1301, determination as to whether a release button has been pressed down is made. When the release button has been pressed down, the processing proceeds to step S1302, and when the release button is not pressed down, the processing proceeds to step S1311.

In step S1302, determination as to whether the continuous image capture can be started, that is, "image capture start determination" processing is performed (description will be given below). Then, the processing proceeds to step S1303.

In step S1303, confirmation as to whether the image capture start determination has been OK (whether an image capture start determination flag is ON) in step S1302 is performed, and the processing proceeds to step S1304 when OK, and proceeds to step S1305 when NG.

In step S1304, the continuous image capture is started until when the release button is released. Then, the processing proceeds to step S1307.

In step S1305, how the restriction is imposed, such as the continuous image capture being not able to be started in a set parameter because the image capture start is NG in step S1303, is confirmed. That is, "recording restriction processing" is performed (description will be given below). When the processing is terminated, the processing proceeds to step S1306.

In step S1306, whether the continuous image capture is started (whether a recording flag is ON) in the state where the restriction is imposed is confirmed in the "recording restriction processing" of step S1305. When the continuous image capture is determined to be started, the processing proceeds to step S1304, and the continuous image capture is started on the basis of a set image capture parameter. When the continuous image capture is not started, the processing proceeds to step S1312.

In step S1307, whether the release button has been released, that is, whether a continuous image capture stop instruction has been given is confirmed. When the release button is determined to be released, the processing proceeds to step S1308. When the release button is not released, the processing proceeds to step S1309 (the continuous image capture is continued).

In step S1308, the continuous image capture of step S1307 is stopped. Then, the processing proceeds to step S1310.

In step S1309, after the start of the continuous image capture, determination as to whether the number of continuously captured images has exceeded the number of continuously capturable images (Shootmax) in the image capture instruction of one time is made. When the number has exceeded Shootmax, the processing proceeds to step S1308, and the continuous image capture is stopped. When the number has not exceeded Shootmax, the continuous image capture is continued, and the processing proceeds to step S1307 and stands by release of the release button.

In step S1310, after termination of the continuous image capture, processing of converting the number of continuously captured images into a time used to record a moving image and accumulating the time, that is, "TotalTime update processing" is performed. As described above, estimation of how much an internal temperature of a device rises is possible by accumulating the moving image recording. Further, in the continuous image capture, similarly, power consumption becomes large as the number of continuously captured images is increased, and estimation of heat generation inside a device is possible. Therefore, like the processing of step S1310, processing of converting the number of continuously captured images this time into the time used to record the moving image, and adding the converted time to a total time of moving image recording times accumulated up to that time and held in a non-volatile memory 56, is performed when the continuous image capture is terminated. A detailed flow will be described below. Then, the processing proceeds to step S1312.

In step S1311, processing other than the continuous image capture is performed. Examples of the processing other than the continuous image capture referred here include recording of a moving image, and a change operation of the image capture parameter. Then, the processing proceeds to step S1312.

In step S1312, determination as to whether the image capture mode is to be terminated is made. When the image capture mode is to be terminated, the image capture mode is terminated. When the image capture mode is not terminated, the processing returns to step S1301, and stands by an operation instruction.

Note that, in the present exemplary embodiment, the number of continuously capturable images (Shootmax) is 1000.

Next, "image capture start determination", "recording restriction processing", and "TotalTime update processing" will be described with reference to FIGS. 23B to 23D.

Figure 23B:
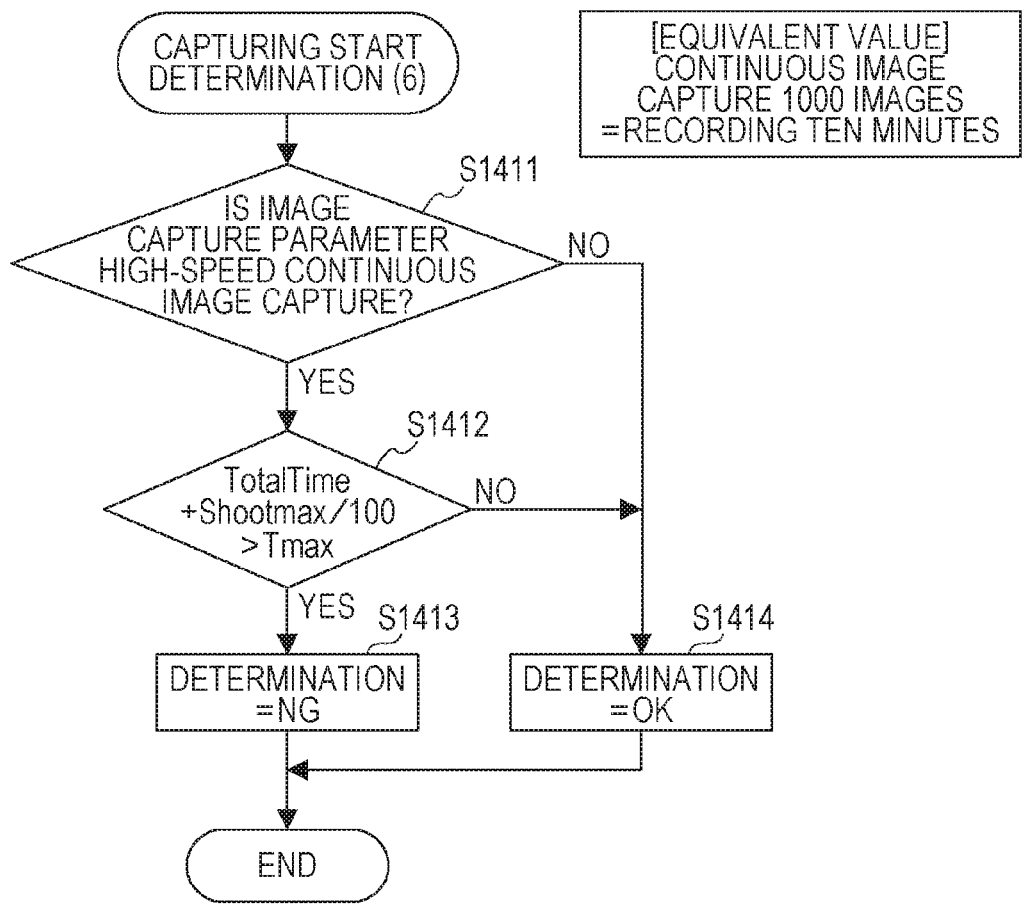
FIG. 23B is a diagram illustrating a processing flow in an image capture start determination (6), of an imaging device as an exemplary embodiment of the present invention.

FIG. 23B illustrates details of step S1302 described above.

In step S1411, determination as to whether the currently set parameter is a high-speed continuous image capture mode is made. Note that, here, a user can set high-speed continuous image capture or low-speed continuous image capture, and the high-speed continuous image capture has higher power consumption and thus has larger heat generation, and the temperature of a device main body is more easily increased. Further, in the low-speed continuous image capture, the temperature does not exceed the temperature of a warning point even if the continuous image capture is performed until a battery runs out. When the parameter is the high-speed continuous image capture mode, the processing proceeds to step S1412. When the parameter is the low-speed continuous image capture mode, the processing proceeds to step S1414.

In step S1412, determination as to whether the time exceeds a restriction time Tmax in a case where the maximum number of continuously capturable images has been captured in one time operation is made. To be specific, a numerical value obtained by dividing the maximum number of continuously capturable images (1000 in the present exemplary embodiment) by 100, and the restriction time Tmax are compared, as against a total time TotalTime held in the non-volatile memory 56. Here, there is relationship of the same temperature increase rate between one hundred images of continuous image capture and image capture at FHD 60 fps for one minute (see FIG. 23E). When the numerical value exceeds the restriction time Tmax, the processing proceeds to step S1413, and when the numerical value does not exceed the restriction time Tmax, the processing proceeds to step S1414.

In step S1413, processing of setting the image capture start determination flag to OFF is performed. Then, the present determination processing is terminated.

In step S1414, processing of setting the image capture start determination flag to ON is performed. Then, the present determination processing is terminated.

As described in the processing of steps S1411 to S1414, the continuous image capture start is not allowed in a case where the time exceeds the restriction time Tmax, when considering the number of continuously capturable images of one time at the point of time when the continuous image capture is started. In doing so, excessive increase in the temperature can be prevented without using a temperature sensor, not only in the moving image recording described in the first exemplary embodiment, but also in the continuous image capture.

Figure 23C:
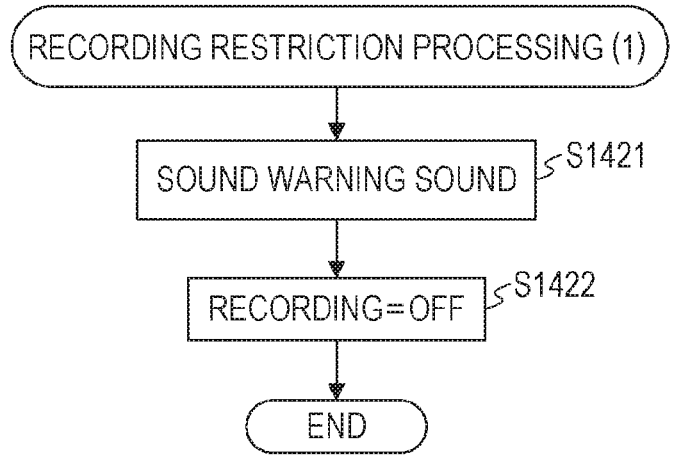
FIG. 23C is a diagram illustrating a processing flow in recording restriction processing (1), of an imaging device as an exemplary embodiment of the present invention.

FIG. 23C illustrates details of step S1305 described above.

In step S1421, similarly to step S811 described above, warning sound is sounded. Then, the processing proceeds to step S1422.

In step S1422, the recording flag is set to OFF. That is, a restriction is imposed so that the continuous image capture cannot be started in the determination of step S1306 afterward.

Figure 23D:
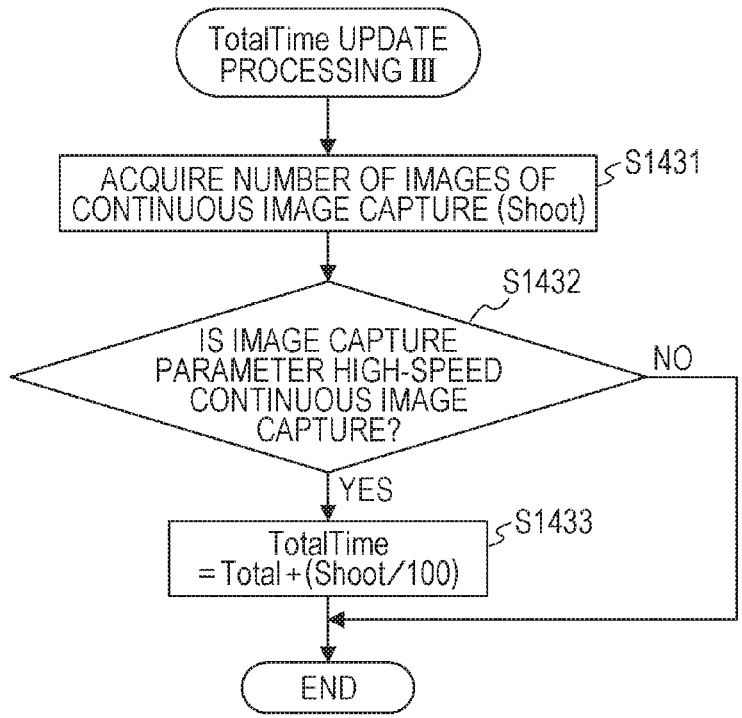
FIG. 23D is a diagram illustrating a processing flow in TotalTime update processing (3), of an imaging device as an exemplary embodiment of the present invention.
Figure 23E:
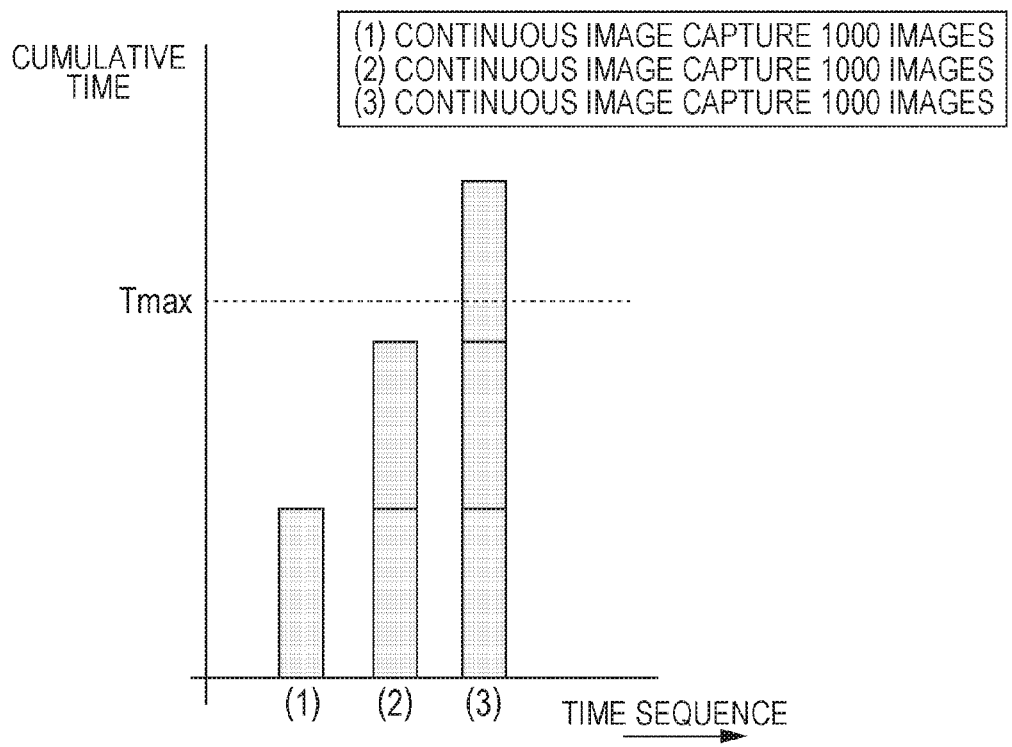
FIG. 23E is a diagram illustrating a transition of a moving image recording total time after the number of images of continuous image capture is converted into a moving image time, when the continuous image capture is performed up to the maximum number of images that can be captured in a one-time operation in a high-speed continuous image capture mode, and an operation to repeat the above continuous image capture is performed several times.

FIG. 23D illustrates details of step S1310 described above.

In step S1431, information about the number of continuously captured images of this time is acquired. Then, the processing proceeds to step S1432.

In step S1432, similarly to step S1411 described above, determination as to whether the currently set image capture parameter is the high-speed continuous image capture mode is made. When the image capture parameter is determined to be the high-speed continuous image capture mode, the processing proceeds to step S1433. When the image capture parameter is not the high-speed continuous image capture mode, the TotalTime update processing is terminated.

In step S1433, after the number of captured images this time is divided by 100 and converted into the moving image recording time, a value thereof is added to the total time TotalTime held in the non-volatile memory 56 (one hundred continuously captured images are converted into the moving image recording at FHD 60 FPS for one minutes in the above description).

Note that, in the low-speed continuous image capture, conversion into the moving image time and update of TotalTime are not performed in consideration of the fact that the heat generation occurs only after the temperature becomes high.

As described in the third exemplary embodiment, by performing the above-described processing, excessive increase in the temperature can be prevented without using a temperature sensor, not only in the moving image recording described in the first exemplary embodiment, but also in the continuous image capture.

As described above, the total time spent to record the moving image is accumulated and its accumulation amount is caused to have relationship with the temperature inside the main body, and control is performed. In doing so, whether the device main body has a high temperature can be determined without using a thermometer. Therefore, there is an advantage that the cost of hardware can be reduced. Further, to seek further accuracy, a lowering amount of the internal temperature and an outside air temperature are measured, and may be combined with the total time of the moving image recording. In doing so, chances to record a moving image can be increased even if power supply is kept ON after the moving image recording is performed many times. Further, by performing control using the total time of the moving image recording, the device can be continuously used within a range where the internal temperature of the device main body does not reach the temperature to watch out, if a pausing time where the moving image recording is not performed is known even when the temperature sensor is broken.

The first embodiment of the imaging device according to the present invention has the following configurations.

An imaging unit capable of capturing a moving image or a series of images, an image capture start instruction receiving unit configured to receive an operation start instruction of the imaging unit, and an image capture parameter setting unit capable of setting at least one image capture parameter to the imaging unit are included. Further, a moving image recording time accumulation unit configured to accumulate a time used to record the moving image, and a moving image recording cumulative time storage unit configured to store a moving image recording cumulative time accumulated by the moving image recording time accumulation unit are included. Further, an image capture determination unit configured to determine whether the imaging unit is able to start an image capture operation from the moving image recording cumulative time stored in the moving image recording cumulative time storage unit and the image capture parameter set by the parameter setting unit is included. Further, an image capture restriction control unit configured to perform processing of imposing a restriction on image capture when the image capture is determined to be not able to be started by the image capture determination unit when the image capture start instruction receiving unit has received an image capture start instruction is included.

Further, the second embodiment of the imaging device according to the present invention has the following configurations.

An imaging unit capable of capturing a moving image or a series of images, an image capture start instruction receiving unit configured to receive an operation start instruction of the imaging unit, and an image capture parameter setting unit capable of setting at least one image capture parameter to the imaging unit are included. Further, a moving image recording time accumulation unit configured to accumulate a time used to record the moving image, and a moving image recording cumulative time storage unit configured to store a moving image recording cumulative time accumulated by the moving image recording time accumulation unit are included. Further, a cumulative time subtraction processing unit configured to subtract the moving image recording cumulative time stored in the moving image recording cumulative time storage unit when a predetermined condition is met is included. Further, an image capture determination unit configured to determine whether the imaging unit is able to start an image capture operation from the moving image recording cumulative time stored in the moving image recording cumulative time storage unit and the image capture parameter set by the parameter setting unit is included. Further, an image capture restriction control unit configured to perform processing of imposing a restriction on image capture when the image capture is determined to be not able to be started by the image capture determination unit when the image capture start instruction receiving unit has received an image capture start instruction is included.

Further, the third embodiment of the imaging device according to the present invention has the following configurations.

An imaging unit capable of capturing a moving image or a series of images, an image capture start instruction receiving unit configured to receive an operation start instruction of the imaging unit, and an image capture parameter setting unit capable of setting at least one image capture parameter to the imaging unit are included. Further, a moving image recording time accumulation unit configured to accumulate a time used to record the moving image, and a moving image recording cumulative time storage unit configured to store a moving image recording cumulative time accumulated by the moving image recording time accumulation unit are included. Further, an image capture determination unit configured to determine whether the imaging unit is able to start an image capture operation from the moving image recording cumulative time stored in the moving image recording cumulative time storage unit and the image capture parameter set by the parameter setting unit is included. Further, an image capture restriction control unit configured to perform processing of imposing a restriction on image capture when the image capture is determined to be not able to be started by the image capture determination unit when the image capture start instruction receiving unit has received an image capture start instruction is included. Further, the image capture determination unit includes a restriction time comparison unit that compares the cumulative time with a predetermined restriction time. Further, a restriction time adding processing unit that adds the restriction time when a predetermined condition is met is included, and the restriction time added by the restriction time adding processing unit and the cumulative time are compared in the restriction time comparison unit.

Further, a fourth embodiment of the imaging device according to the present invention has the following configurations.

An imaging unit capable of capturing a moving image or a series of images, an image capture start instruction receiving unit configured to receive an operation start instruction of the imaging unit, and an image capture parameter setting unit capable of setting at least one image capture parameter to the imaging unit is included. Further, a moving image recording time accumulation unit configured to accumulate a time used to record the moving image, and a moving image recording cumulative time storage unit configured to store a moving image recording cumulative time accumulated by the moving image recording time accumulation unit are included. Further, a cumulative time subtraction processing unit configured to subtract the moving image recording cumulative time stored in the moving image recording cumulative time storage unit when a predetermined condition is met is included. Further, an image capture determination unit configured to determine whether the imaging unit is able to start an image capture operation from the moving image recording cumulative time stored in the moving image recording cumulative time storage unit and the image capture parameter set by the parameter setting unit is included. Further, an image capture restriction control unit configured to perform processing of imposing a restriction on image capture when the image capture is determined to be not able to be started by the image capture determination unit when the image capture start instruction receiving unit has received an image capture start instruction is included. Further, a first temperature detection unit that measures an internal temperature of a device main body, and a temperature storage unit that stores a first temperature in moving image recording termination. Further, the first temperature detection unit includes a first error detection unit, and the cumulative time subtraction processing unit includes a control unit that performs control not to perform cumulative time subtraction processing when an error is determined by the first error detection unit.

As described above, the present invention has been described in detail on the basis of the favorable exemplary embodiments. However, the present invention is not limited to these specific exemplary embodiments, and various embodiments without departing from the gist of the invention are also included in the present invention. A part of the above-described exemplary embodiments may be appropriately combined. Further, a case in which a program of software that realizes the functions of the above-described exemplary embodiments is directly supplied from a recording medium or is supplied using wired/wireless communication to a system or a device including a computer that can execute the program, and executes the program is also included in the present invention. Therefore, program codes supplied and installed to the computer to realize the function processing of the present invention by the computer also realize the present invention. That is, the computer program for realizing the function processing of the present invention is also included in the present invention. In that case, any form of the program, such as object codes, a program executed by an interpreter, or script data supplied to an OS, can be employed as long as the function of the program is included. Examples of the recording medium for supplying the program include a hard disk, a magnetic recording medium such as a magnetic tape, optical/magneto-optical media, and a non-volatile semiconductor memory. Further, as a method of supplying the program, a method of storing a computer program that forms the present invention in a server on a computer network, downloading and programming the computer program by a client computer in connection can be considered.

The above configuration enables accurate temperature detection, and thus there is an advantage that imposing a restriction on the moving image recording can be avoided without shutting down the power supply after the moving image capture is performed many times, if the internal temperature of the device is decreased.

Further, the temperature can be detected even if the temperature sensor has some sort of trouble, and thus there is an advantage that the restriction can be imposed on the use of the device due to heat generation.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-201314, filed Oct. 9, 2015, which is hereby incorporated by reference herein in its entirety.

What is claimed is:

1. An imaging device comprising:
an imaging unit capable of capturing a moving image or a series of images;
an image capture start instruction receiving unit configured to receive an operation start instruction of the imaging unit;
an image capture parameter setting unit capable of setting at least one image capture parameter to the imaging unit;
a moving image recording time accumulation unit configured to accumulate a time used to record the moving image;
a moving image recording cumulative time storage unit configured to store a moving image recording cumulative time accumulated by the moving image recording time accumulation unit;
an image capture determination unit configured to determine whether the imaging unit is able to start an image capture operation from the moving image recording cumulative time stored in the moving image recording cumulative time storage unit and the image capture parameter set by the parameter setting unit; and
an image capture restriction control unit configured to perform processing of imposing a restriction on image capture when the image capture is determined to be not able to be started by the image capture determination unit when the image capture start instruction receiving unit has received an image capture start instruction.

2. The imaging device according to claim 1, wherein the image capture determination unit determines that image capture start is not able to be started when the cumulative time has exceeded a predetermined time.

3. The imaging device according to claim 1, wherein the image capture restriction control unit prohibits image capture with the parameter set by the image capture parameter setting unit.

4. The imaging device according to claim 1, wherein the image capture restriction control unit prohibits image capture in a first image capture mode, and makes image capture in a second image capture mode available, where a mode to perform image capture with the parameter set by the image capture parameter setting unit is the first image capture mode, and a mode to perform image capture with a parameter not set by the image capture parameter setting unit is the second image capture mode.

5. The imaging device according to claim 4, wherein, the second image capture mode has smaller power consumption in the image capture than the first image capture mode.

6. The imaging device according to claim 4, wherein the image capture restriction control unit prohibits the image capture in the first image capture mode, and performs display to prompt the image capture in the second image capture mode.

7. The imaging device according to claim 4, wherein the image capture restriction control unit sounds warning sound when prohibiting the image capture in the first image capture mode.

8. The imaging device according to claim 1, wherein the moving image recording time accumulation unit changes a method of accumulating the time used to record the moving image according to parameter setting set by the image capture parameter setting unit.

9. The imaging device according to claim 8, wherein
the moving image recording time accumulation unit performs integration by a first accumulation method in a case of integrating the time used to record the moving image in the first image capture mode to the cumulative time, and performs integration by a second accumulation method in a case of integrating the time used to record the moving image in the second image capture mode to the cumulative time, and a larger value is integrated in the first accumulation method than in the second accumulation method.

10. The imaging device according to claim 1, wherein
a third accumulation method of integrating a time in which the moving image is not being recorded to the cumulative time is included, and a larger value is integrated in the first accumulation method than in the third accumulation method.

11. The imaging device according to claim 4, wherein
a maximum time of moving image recording of one time in a first image capture mode is smaller than a maximum time of the moving image recording of one time in a second image capture mode.

12. The imaging device according to claim 1, wherein
the image capture restriction control unit makes the image capture in a time shorter than a maximum time of moving image recording of one time available, and stops the moving image recording after the time passes.

13. An imaging device comprising:
an imaging unit capable of capturing a moving image or a series of images;
an image capture start instruction receiving unit configured to receive an operation start instruction of the imaging unit;
an image capture parameter setting unit capable of setting at least one image capture parameter to the imaging unit;
a moving image recording time accumulation unit configured to convert the number of captured images into a time used to record the moving image, and accumulate the recording time;
a moving image recording cumulative time storage unit configured to store a moving image recording cumulative time accumulated by the moving image recording time accumulation unit;
an image capture determination unit configured to determine whether the imaging unit is able to start an image capture operation from the moving image recording cumulative time stored in the moving image recording cumulative time storage unit and the image capture parameter set by the parameter setting unit; and
an image capture restriction control unit configured to perform processing of imposing a restriction on image capture when the image capture is determined to be not able to be started by the image capture determination unit when the image capture start instruction receiving unit has received an image capture start instruction.

14. The imaging device according to claim 1, further comprising:
a cumulative time subtraction processing unit configured to subtract the moving image recording cumulative time stored in the moving image recording cumulative time storage unit when a predetermined condition is met.

15. The imaging device according to claim 14, further comprising:
a first temperature detection unit configured to measure an internal temperature of a device main body, wherein
the cumulative time is subtracted in the cumulative time subtraction processing unit on the basis of the temperature acquired from the first temperature detection unit.

16. The imaging device according to claim 15, further comprising:
a temperature storage unit configured to acquire a first temperature from the first temperature detection unit when the image capture is to be terminated, and configured to store the first temperature, wherein
the moving image recording cumulative time stored in the moving image recording cumulative time storage unit is subtracted on the basis of a temperature lowering amount that is a difference between the temperature acquired from the first temperature detection unit when the image capture start instruction receiving unit has received the image capture start instruction, and the first temperature stored in the temperature storage unit.

17. The imaging device according to claim 14, further comprising:
a second temperature detection unit configured to measure a temperature outside the device main body, wherein
the moving image recording cumulative time stored in the moving image recording cumulative time storage unit is subtracted when the temperature acquired from the second temperature detection unit is lower than a predetermined temperature.

18. The imaging device according to claim 17, wherein
the moving image recording cumulative time stored in the moving image recording cumulative time storage unit is returned to an initial value when the temperature acquired from the second temperature detection unit is lower than a predetermined temperature.

19. The imaging device according to claim 14, wherein
the moving image recording cumulative time stored in the moving image recording cumulative time storage unit is subtracted when a predetermined time or more has passed from previous moving image recording termination when the image capture start instruction receiving unit has received the image capture start instruction.

20. The imaging device according to claim 14, wherein
the moving image recording cumulative time stored in the moving image recording cumulative time storage unit is returned to an initial value when a predetermined time or more has passed from previous moving image recording termination when the image capture start instruction receiving unit has received the image capture start instruction.

21. An imaging device comprising:
an imaging unit capable of capturing a moving image or a series of images;
an image capture start instruction receiving unit configured to receive an operation start instruction of the imaging unit;
an image capture parameter setting unit capable of setting at least one image capture parameter to the imaging unit;
a moving image recording time accumulation unit configured to accumulate a time used to record the moving image;
a moving image recording cumulative time storage unit configured to store a moving image recording cumulative time accumulated by the moving image recording time accumulation unit;
an image capture determination unit configured to determine whether the imaging unit is able to start an image capture operation from the moving image recording cumulative time stored in the moving image recording cumulative time storage unit and the image capture parameter set by the parameter setting unit; and an image capture restriction control unit configured to perform processing of imposing a restriction on image capture when the image capture is determined to be not able to be started by the image capture determination unit when the image capture start instruction receiving unit has received an image capture start instruction, wherein the image capture determination unit includes a restriction time comparison unit that compares the cumulative time with a predetermined restriction time, and a restriction time adding processing unit that adds the restriction time when a predetermined condition is met, and the restriction time added by the restriction time adding processing unit and the cumulative time are compared in the restriction time comparison unit.

22. The imaging device according to claim 21, further comprising:

a first temperature detection unit configured to measure an internal temperature of a device main body, wherein the restriction time is added in the restriction time adding processing unit on the basis of the temperature acquired from the first temperature detection unit.

23. The imaging device according to claim 22, further comprising:

a temperature storage unit configured to acquire a first temperature from the first temperature detection unit when the image capture is terminated, and configured to store the first temperature, wherein the restriction time is added in the restriction time adding processing unit on the basis of a temperature lowering amount that is a difference between the temperature acquired from the first temperature detection unit when the image capture start instruction receiving unit has received the image capture start instruction, and the first temperature stored in the temperature storage unit.

24. The imaging device according to claim 21, further comprising:

a second temperature detection unit configured to measure a temperature outside the device main body, wherein the moving image recording cumulative time stored in the moving image recording cumulative time storage unit is subtracted and the restriction time is also returned to an initial value when the temperature acquired from the second temperature detection unit is lower than a predetermined temperature.

25. The imaging device according to claim 21, wherein the moving image recording cumulative time stored in the moving image recording cumulative time storage unit is subtracted and the restriction time is also returned to an initial value when a predetermined time or more has passed from previous moving image recording termination when the image capture start instruction receiving unit has received the image capture start instruction.

26. The imaging device according to claim 16, further comprising:

a first temperature detection unit configured to measure an internal temperature of a device main body; and a temperature storage unit configured to store a first temperature in moving image recording termination, wherein the first temperature detection unit includes a first error detection unit, and the cumulative time subtraction processing unit includes a control unit that performs control not to perform cumulative time subtraction processing when an error is determined by the first error detection unit.

27. The imaging device according to claim 26, wherein the cumulative time is subtracted in the cumulative time subtraction processing unit on the basis of the temperature acquired from the first temperature detection unit.

28. The imaging device according to claim 27, wherein the temperature storage unit acquires a first temperature from the first temperature detection unit when the image capture is terminated and stores the first temperature, and the moving image recording cumulative time stored in the moving image recording cumulative time storage unit is subtracted on the basis of a temperature lowering amount that is a difference between the temperature acquired from the first temperature detection unit when the image capture start instruction receiving unit has received the image capture start instruction, and the first temperature stored in the temperature storage unit.

29. The imaging device according to claim 26, further comprising:

a second temperature detection unit configured to measure a temperature outside the device main body, wherein the moving image recording cumulative time stored in the moving image recording cumulative time storage unit is subtracted when the temperature acquired from the second temperature detection unit is lower than a predetermined temperature.

30. The imaging device according to claim 29, wherein the moving image recording cumulative time stored in the moving image recording cumulative time storage unit is returned to an initial value when the temperature acquired from the second temperature detection unit is lower than a predetermined temperature.

31. The imaging device according to claim 26, further comprising:

a second temperature detection unit configured to measure a temperature outside the device main body, and including a second error detection unit, wherein the moving image recording cumulative time stored in the moving image recording cumulative time storage unit is subtracted when no error is determined by the second error detection unit, and the moving image recording cumulative time stored in the moving image recording cumulative time storage unit is not subtracted when the error is determined by the second error detection unit.

32. The imaging device according to claim 26, wherein the determination of the error includes not only an error value from a temperature sensor, but also values of a high temperature and a low temperature.

* * * * *